United States Patent
Yanagi

(10) Patent No.: US 9,489,881 B2
(45) Date of Patent: Nov. 8, 2016

(54) SHADING CORRECTION CALCULATION APPARATUS AND SHADING CORRECTION VALUE CALCULATION METHOD

(71) Applicant: CANON KABUSHIKI KAISHA, Tokyo (JP)

(72) Inventor: Michihisa Yanagi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/753,626

(22) Filed: Jun. 29, 2015

(65) Prior Publication Data

US 2016/0005348 A1 Jan. 7, 2016

(30) Foreign Application Priority Data

Jul. 1, 2014 (JP) ................................. 2014-135709
Jul. 29, 2014 (JP) ................................. 2014-153541

(51) Int. Cl.
| | | |
|---|---|---|
| G09G 3/20 | (2006.01) | |
| G09G 3/00 | (2006.01) | |
| G09G 5/02 | (2006.01) | |
| G06T 5/00 | (2006.01) | |
| G06T 1/60 | (2006.01) | |
| H04N 1/40 | (2006.01) | |
| H04N 1/60 | (2006.01) | |
| H04N 9/69 | (2006.01) | |
| H04N 5/57 | (2006.01) | |
| G06T 5/50 | (2006.01) | |

(52) U.S. Cl.
CPC ............ *G09G 3/2003* (2013.01); *G06T 5/008* (2013.01); *G06T 5/50* (2013.01); *G09G 3/002* (2013.01); *G06T 2207/10024* (2013.01); *G09G 2320/0233* (2013.01); *G09G 2320/0242* (2013.01); *G09G 2320/0666* (2013.01)

(58) Field of Classification Search
CPC combination set(s) only.
See application file for complete search history.

(56) References Cited

U.S. PATENT DOCUMENTS 7,145,597 B1 * 12/2006 Kinjo ................. H04N 1/00132
 348/222.1
7,860,339 B2 * 12/2010 Yamashita .............. G06T 5/004
 345/600

(Continued)

FOREIGN PATENT DOCUMENTS

JP 2005017715 A 1/2005
JP 2011150349 A 8/2011

*Primary Examiner* — Wesner Sajous
(74) *Attorney, Agent, or Firm* — Rossi, Kimms & McDowell LLP

(57) ABSTRACT

The apparatus calculates a first relation representing a relation of mapping from an image capturing coordinate system of a camera to a shading correction coordinate system of a display apparatus, by using a first captured image acquired by capturing a first display image, and calculates a second relation by removing, from the first relation, a part corresponding to an object located between the first display image and the camera. The apparatus calculates a first gradation value in the shading correction coordinate system by performing a mapping transformation using the second relation on a second captured image acquired by capturing a second display image, calculates from the first gradation value a first correction value for the shading correction coordinate system, and calculates through an interpolation using the first correction value a second correction value for a part thereof where the first gradation value is not calculated.

20 Claims, 28 Drawing Sheets

(56) References Cited

U.S. PATENT DOCUMENTS

| | | | |
|---|---|---|---|
| 8,248,483 B2 * | 8/2012 | Ezawa | G06T 7/0004 348/222.1 |
| 2003/0020974 A1 * | 1/2003 | Matsushima | G06T 5/008 358/521 |
| 2006/0274164 A1 * | 12/2006 | Kimura | H04N 5/77 348/231.3 |
| 2010/0265356 A1 * | 10/2010 | Takano | G06T 5/009 348/223.1 |
| 2010/0322509 A1 * | 12/2010 | Shimizu | G06T 5/002 382/162 |

* cited by examiner $$c = \frac{(V-y')(H-x')c_{i,j} + (V-y')x'c_{i+1,j} + y'(H-x')c_{i,j+1} + y'x'c_{i+1,j+1}}{HV}$$

$$\begin{cases} c(p) = \dfrac{p}{p_1}c_1, p < p_1 \\ c(p) = c_n + \dfrac{p-p_n}{p_{n+1}-p_n}(c_{n+1}-c_n), p_n \le p < p_{n+1} \\ c(p) = c_5 - \dfrac{p-p_5}{max-p_5}c_5, p_5 \le p \end{cases}$$

FIG. 8

SHADING CORRECTION CALCULATION APPARATUS AND SHADING CORRECTION VALUE CALCULATION METHOD

BACKGROUND OF THE INVENTION

Field of the Invention

The present invention relates to an apparatus and a method of correcting luminance unevenness and color unevenness, which are collectively referred to as shading, of an image displayed by an image projection apparatus or a direct-view display apparatus.

Description of the Related Art

Examples of a method of automatically correcting shading, such as luminance unevenness and color unevenness of an image displayed by an image projection apparatus (hereinafter referred to as a projector) or a direct-view display apparatus (hereinafter referred to as a direct-view display), include following methods.

For example, Japanese Patent Laid-open No. 2011-150349 discloses a method of preventing shading of a display image displayed by a projector or a direct-view display, by using a captured image obtained by capturing the display image through an image capturing apparatus. Japanese Patent Laid-open No. 2005-017715 discloses a method of correcting shading, streaky shading in particular, of a display image displayed by a projector, by using a captured image obtained by capturing the display image through an image capturing apparatus.

However, the methods disclosed in Japanese Patent Laid-open No. 2011-150349 and Japanese Patent Laid-open No. 2005-017715 are not applicable to a case where an obstacle (blocking object) is placed between the display image and the image capturing apparatus that captures the display image and thereby the obstacle is captured in the captured image obtained by the image capturing apparatus. For example, in such a method, a measuring device such as a color illuminometer, which can measure a chromaticity, is disposed in front of a display surface (that is, between the display surface and the image capturing apparatus), and a gamma characteristic is set by using a chromaticity of the display image measured by the measuring device. In this method, however, the measuring device is captured as an object in the captured image. When the measuring device is disposed at a back of a hole formed in a projection surface (screen) as a display surface for the projector, the measuring device is also captured as an object in the captured image.

In the method disclosed in Japanese Patent Laid-open No. 2011-150349, since a band-pass filter is applied to the entire captured image obtained by the image capturing apparatus, use of a filter as the band-pass filter having such an intensity that the obstacle disappears from the captured image spoils information relating to the shading in the captured image. The use of such a filter prevents production of a correction value for sufficiently correcting the shading of the display image from the captured image. On the other hand, use of a filter as the band-pass filter having a low intensity produces a correction value corresponding to the obstacle remaining in the captured image, so that applying this correction value to a corresponding part of the display image results in unnecessary strong shading correction.

In typical projectors, a correction circuit that performs the shading correction is configured to have a resolution much lower than that of a light-modulating element, such as a liquid crystal panel or a digital micromirror device (DMD), which modulates light in the projector. Thus, an interpolation process is performed to match the resolution of the correction circuit to the resolution of the light-modulating element. However, correcting a display image including a high frequency image area through the correction circuit may result in insufficient correction of the high frequency image area, in coloring on a low frequency image area due to an influence of the obstacle, and in an unintended color produced in the interpolation process.

These problems occur also when the method disclosed in Japanese Patent Laid-open No. 2005-017715 is applied to a captured image including a captured obstacle.

SUMMARY OF THE INVENTION

The present invention provides an apparatus and a method each capable of calculating a correction value for sufficiently correcting shading of a display image when an obstacle exists between the display image and an image capturing apparatus. The present invention also provides an apparatus and a method each capable of calculating a correction value for sufficiently correcting shading of a display image when a measuring device that measures a chromaticity is captured in a captured image obtained by capturing the display image.

The present invention provides as an aspect thereof a shading correction calculation apparatus configured to calculate a correction value by using a captured image acquired from an image capturing apparatus that captures a display image displayed on a display surface by an image display apparatus, the correction value being used for a shading correction to be performed by the image display apparatus. The shading correction calculation apparatus includes a first mapping calculator configured to calculate a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus, a second mapping calculator configured to calculate a second mapping relation by detecting an object part of the first mapping relation and removing the object part from the first mapping relation, the object part corresponding to an object located between the display surface and the image capturing apparatus, a gradation value calculator configured to calculate a first gradation value in the shading correction coordinate system by performing a mapping transformation using the second mapping relation on a second captured image acquired from the image capturing apparatus that captures a second display image displayed by the image display apparatus, a first correction value calculator configured to calculate, from the first gradation value, a first correction value as the correction value for a first part of the shading correction coordinate system, and a second correction value calculator configured to calculate, through an interpolation process using the first correction value, a second correction value as the correction value for a second part of the shading correction coordinate system, the second part being a part where the first gradation value is unable to be calculated by the mapping transformation.

The present invention provides as another aspect thereof a shading correction calculation apparatus configured to calculate a correction value by using a captured image acquired from an image capturing apparatus that captures a display image displayed on a display surface by an image display apparatus, the correction value being used for a shading correction to be performed by the image display apparatus. The shading correction calculation apparatus includes a first mapping calculator configured to calculate a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus, a second mapping calculator configured to calculate a second mapping relation by detecting an object part of the first mapping relation and removing the object part from the first mapping relation, the object part corresponding to an object located between the display surface and the image capturing apparatus, a first gradation value calculator configured to calculate a first gradation value in a first part of the shading correction coordinate system by performing a mapping transformation using the second mapping relation on a second captured image acquired from the image capturing apparatus that captures a second display image displayed by the image display apparatus, a second gradation value calculator configured to calculate, through an interpolation process using the first gradation value, a second gradation value in a second part of the shading correction coordinate system, the second part being a part where the first gradation value is unable to be calculated by the mapping transformation, and a correction value calculator configured to calculate the correction values for the first and second parts by using the first and second gradation values.

The present invention provides as still another aspect thereof a shading correction calculation method of calculating a correction value by using a captured image acquired from an image capturing apparatus that captures a display image displayed on a display surface by an image display apparatus, the correction value being used for a shading correction to be performed by the image display apparatus. The method includes: calculating a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus; calculating a second mapping relation by detecting an object part of the first mapping relation and removing the object part from the first mapping relation, the object part corresponding to an object located between the display surface and the image capturing apparatus; calculating a first gradation value in the shading correction coordinate system by performing a mapping transformation using the second mapping relation on a second captured image acquired from the image capturing apparatus that captures a second display image displayed by the image display apparatus; calculating, from the first gradation value, a first correction value as the correction value for a first part of the shading correction coordinate system; and calculating, through an interpolation process using the first correction value, a second correction value as the correction value for a second part of the shading correction coordinate system, the second part being a part where the first gradation value is unable to be calculated by the mapping transformation.

The present invention provides as yet another aspect thereof a shading correction calculation method of calculating a correction value by using a captured image acquired from an image capturing apparatus that captures a display image displayed on a display surface by an image display apparatus, the correction value being used for a shading correction to be performed by the image display apparatus. The method includes: calculating a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus; calculating a second mapping relation by detecting an object part of the first mapping relation and removing the object part from the first mapping relation, the object part corresponding to an object located between the display surface and the image capturing apparatus; calculating a first gradation value in a first part of the shading correction coordinate system by performing a mapping transformation using the second mapping relation on a second captured image acquired from the image capturing apparatus that captures a second display image displayed by the image display apparatus; calculating, through an interpolation process using the first gradation value, a second gradation value in a second part of the shading correction coordinate system, the second part being a part where the first gradation value is unable to be calculated by the mapping transformation; and calculating the correction values for the first and second parts by using the first and second gradation values.

The present invention provides as further another aspect thereof a non-transitory computer-readable storage medium storing a shading correction value calculation program as a computer program configured to cause a computer to perform a calculation process according to the above shading correction value calculation method.

The present invention provides as yet further another aspect thereof an image display apparatus configured to display a display image by projecting the display image on a display surface. The apparatus includes an image capturing apparatus configured to capture the display image to produce a captured image, and the image display above shading correction calculation apparatus.

Further features of the present invention will become apparent from the following description of exemplary embodiments with reference to the attached drawings.

BRIEF DESCRIPTION OF THE DRAWINGS

FIG. 8 is a table illustrating a relation between a pixel position and a mapping destination in Embodiment 1.

DESCRIPTION OF THE EMBODIMENTS

Exemplary embodiments of the present invention will be described below with reference to the accompanied drawings.

Embodiment 1

Figure 1A:
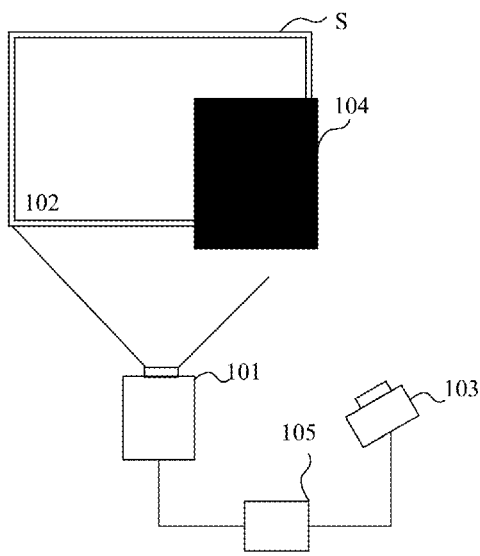
FIG. 1A is a block diagram illustrating an arrangement of a shading correction calculation apparatus, an image projection apparatus and an image capturing apparatus that are Embodiment 1 and Embodiment 2 of the present invention, and illustrating a configuration of the image projection apparatus.

FIG. 1A illustrates an image projection apparatus (hereinafter referred to as "a projector") 101 as an image display apparatus, a shading correction calculation apparatus (hereinafter referred to as "a correction value calculator") 105 that is Embodiment 1 (first embodiment) of the present invention, and an image capturing apparatus (hereinafter referred to as "a camera") 103. These constitute an image projection system.

The projector 101 drives a light-modulating element described later according to an input image and projects light modulated by the light-modulating element onto a predetermined projection surface (display surface) S such as a screen, thereby displaying a projection image 102 as a display image.

The camera 103 captures an image in an image capturing range (angle of view) including the projection image 102 on the projection surface S and produces a captured image.

The correction value calculator 105 calculates, by using the captured image acquired from the camera 103, a correction value (hereinafter referred to as "a shading correction value") for correcting shading (that is, for performing shading correction) such as luminance unevenness and color unevenness in the projection image 102. Specifically, the correction value calculator 105 of this embodiment calculates a shading correction value that allows a sufficient shading correction even when a blocking object (hereinafter referred to as "an obstacle") 104 exists between the projection surface S, on which the projection image 102 is supposed to be displayed, and the camera 103.

Although in this embodiment the correction value calculator 105, the camera 103 and the projector 101 are separated from one another, they may be integrally configured as a single apparatus (projector).

Figure 1B:
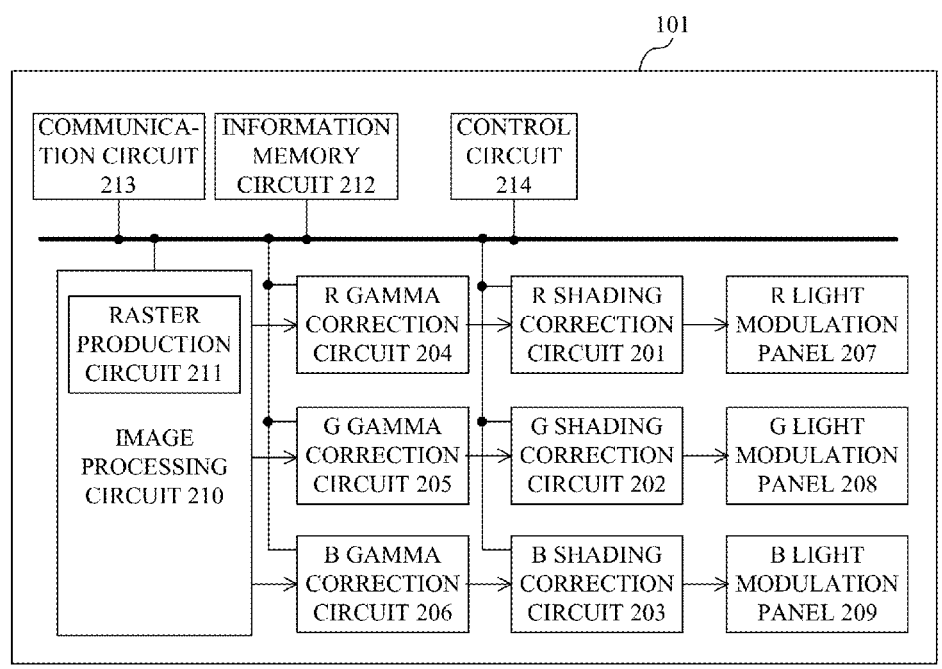
FIG. 1B is a block diagram of a configuration of an image projection apparatus that is Embodiments 1 to 3.

FIG. 1B illustrates a configuration of the projector 101. The projector 101 has, as a function relating to the shading correction, a function of projecting a specific image described later under control of the correction value calculator 105. This function of the projector 101 further includes writing of a red shading correction value, a green shading correction value and a blue shading correction value, which are the shading correction values for respective colors, to a shading correction circuit 201 for red (R), a shading correction circuit 202 for green (G) and a shading correction circuit 203 for blue (B). In addition, the projector 101 stores, as initial values of the shading correction values, initial shading correction values of the shading correction circuits 201 to 203.

The shading correction circuits 201 to 203 respectively calculate the R, G and B shading correction values from gradation values (luminance values; hereinafter each referred to as "an input gradation value") of pixels of input R, G and B images (image signals) and pixel positions (hereinafter each referred to as "a point") having the input gradation values. In the calculation, the shading correction circuits 201 to 203 each perform an interpolation process using the shading correction values for representative points previously stored, and calculate the shading correction values at points other than the representative points. The representative points at which the shading correction values are provided and the points other than the representative points are hereinafter collectively referred to as "correction points". Then, the shading correction values at the representative points (hereinafter collectively referred to as "representative shading correction values") among the correction points are added to the input gradation values at the representative points, and the shading correction values calculated through the interpolation process are added to the input gradation values at the points other than the representative points among the correction points.

As just described, each shading correction circuit previously stores the shading correction values not at all points but only at the representative points whose number is predetermined, and uses the stored shading correction values to calculate the shading correction values at the correction points other than the representative points. The representative points and the shading correction values at the representative points are stored in a volatile memory region called a register, which is writable and readable through a bus.

A gamma correction circuit 204 for R, a gamma correction circuit 205 for G and a gamma correction circuit 206 for B each convert an input gradation value into a specific gradation value. Each gamma correction circuit has a one-dimensional look-up table (1DLUT) in the register, and can read and rewrite information on the 1DLUT through the bus.

A light-modulating panel 207 for R, a light-modulating panel 208 for G and a light-modulating panel 209 for B, as the light-modulating elements, each include multiple pixels and modulate light from a light source (not illustrated) by each pixel. Each light-modulating panel is a transmissive liquid crystal panel, a reflective liquid crystal panel or a DMD, for example. The light is modulated by changing a transmittance of the transmissive liquid crystal panel, by changing reflectance of the reflective liquid crystal panel, and by changing an ON duty ratio of the DMD. Light modulated by each of the light-modulating panels 207, 208 and 209 is projected onto the projection surface S through a projection optical system (not illustrated). Description will hereinafter be made of a case where the reflective liquid crystal panel is used as the light-modulating panels 207, 208 and 209.

An image processing circuit 210 converts an input image (video) from an image input terminal (not illustrated) into gradation values in each of R, G and B. The image processing circuit 210 includes thereinside a raster production circuit 211. The raster production circuit 211 produces a raster image as the specific image having an arbitrary gradation in each of R, G and B, and outputs the raster image from the image processing circuit 210.

An information memory circuit 212 stores, as the 1DLUT, R-1DLUT, G-1DLUT and B-1DLUT for changing the reflectances (hereinafter each referred to as "a panel reflectance") of the light-modulating panels 207, 208 and 209 in a predetermined relation such as a linear relation in response to the input gradation values input to the gamma correction circuits 204, 205 and 206. The information memory circuit 212 also stores the R, G and B shading correction values, which are calculated by the correction value calculator 105. The R, G and B shading correction values are respectively set to the shading correction circuits 201, 202 and 203 for R, G and B when the projector 101 is started up.

A communication circuit 213 communicates commands for controlling the projector 101 from the correction value calculator 105 to the projector 101. The commands sent from the correction value calculator 105 to the projector 101 include a raster gradation set command, a gamma set command, a shading correction value write command and an initial shading correction value rewrite command. The raster gradation set command instructs setting of R, G and B gradations to the raster production circuit 211, and outputting of a raster image having the gradations from the image processing circuit 210. The gamma set command instructs setting of the R-, G and B-1DLUTs stored in the information memory circuit 212 to the gamma correction circuits 204, 205 and 206. The shading correction value write command instructs writing (setting) of the R, G, and B shading correction values to the shading correction circuits 201, 202 and 203. The initial shading correction value rewrite command instructs rewriting of the initial shading correction values stored in the information memory circuit 212, which are set to the shading correction circuits 201, 202 and 203.

A control circuit 214 receives the commands described above from the correction value calculator 105 and performs control to execute processes corresponding to the commands. The control circuit 214 reads, when the projector 101 starts image projection, an initial value of each circuit from the information memory circuit 212 and sets the initial value to the circuit.

Figure 2A:
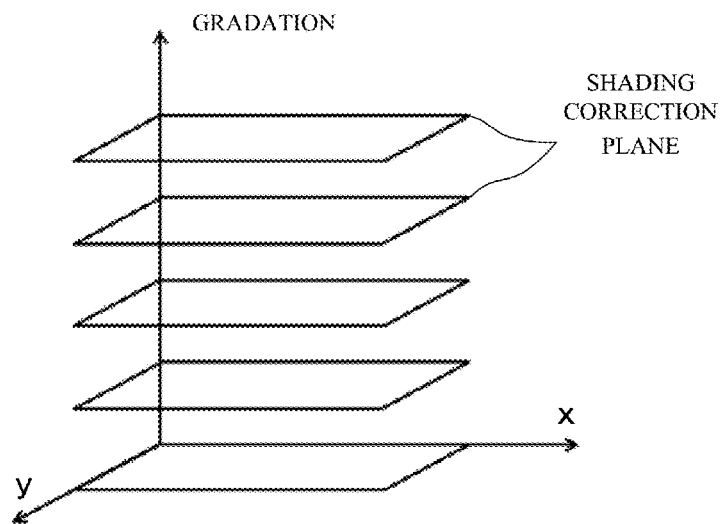
FIG. 2A illustrates multiple shading correction planes in Embodiment 1.
Figure 2B:
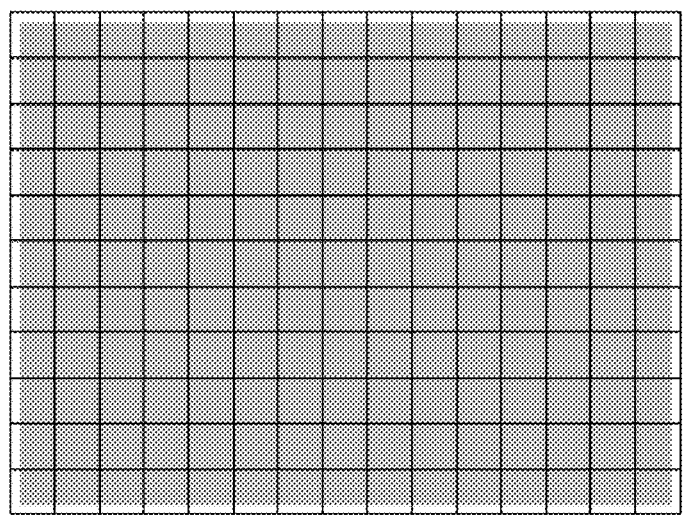
FIG. 2B illustrates a representative point on each shading correction plane in Embodiment 1.

FIG. 2A schematically illustrates a process at each of the shading correction circuits 201, 202 and 203. A coordinate of the above-described point in a horizontal direction of an image (image signal) is represented by x, and a coordinate of the point in a vertical direction of the image is represented by y. In FIGS. 2A and 2B, a height represents a gradation. Parallelograms illustrated in FIG. 2A represent shading correction planes stored for multiple specific gradations in the register of each shading correction circuit. Each shading correction plane holds the representative shading correction values at the respective representative points whose number is fewer than that of all the pixels of the image.

The shading correction value at the correction point other than the representative points at each specific gradation is calculated through the interpolation process using the representative shading correction values at more than two (for example, four) representative points near the correction point at the specific gradation.

The shading correction value at the correction point at a correction target gradation other than the specific gradations is calculated as follows. First, two shading correction planes at two specific gradations above and below the correction target gradation are selected. Next, the shading correction value at a point on each of the two selected shading correction planes (the representative shading correction value or the shading correction value calculated through the interpolation process on the selected plane) corresponding to the correction point is selected. Then, the two selected shading correction values and ratios of the two specific gradations of these two selected shading correction values to the correction target gradation are used in a linear interpolation to calculate the shading correction value at the correction point at the correction target gradation.

The shading correction value for a correction target gradation lower than a shading correction plane at a lowest specific gradation is calculated through a linear interpolation with the shading correction value at the lowest specific gradation set to be zero. The shading correction value for a correction target gradation higher than a shading correction plane at a highest specific gradation is calculated through a similar process with the shading correction value at the highest specific gradation set to be zero.

FIG. 2B illustrates one shading correction plane provided for each shading correction circuit. A meshed area in FIG. 2B includes a white area and a gray area; the gray area represents an effective pixel area of the light-modulating panel, and the gray and white areas together represent an area (hereinafter referred to as "a shading correction area") in which the shading correction value can be calculated by the shading correction circuit. The white area may be regarded as an unnecessary excess area in the calculation of the shading correction value. However, in many cases, the representative points are arranged at an equal interval in a mesh, and thus an integral multiple of the interval of the representative points is not necessarily equal to a length of the effective pixel area. Thus, in general, an area larger than the effective pixel area is provided as the shading correction area. Lines in the mesh in FIG. 2B are illustrated to indicate the representative points and thus are not actually displayed on the light-modulating panel. Intersection points in the mesh represent positions of the representative points.

In FIG. 2B, a total of 192 representative points with 16 representative points in the horizontal direction and 12 representative points in the vertical direction are provided on the single shading correction plane. The representative shading correction value is held at each representative point. As described above, the shading correction value at the correction point other than the representative points on the shading correction plane is calculated from representative shading correction values at four representative points surrounding the correction point by the interpolation process (linear interpolation).

Figure 3A:
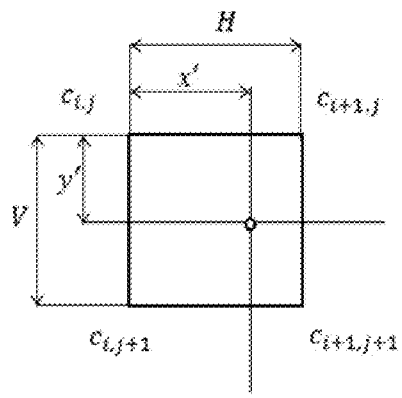
FIGS. 3A and 3B illustrate an interpolation process for calculating a shading correction value at a correction point in Embodiment 1.

FIG. 3A illustrates the shading correction value calculated from the representative shading correction values at the four representative points on the shading correction plane by the linear interpolation.

Values $c_{i,j}$, $c_{i+1,j}$, and $c_{i,j+1}$ and $c_{i+1,j+1}$ represent the representative shading correction values at the four representative points (i,j), (i+1,j), (i,j+1) and (i+1,j+1). H represents an arrangement interval of the representative points in the horizontal direction, and V represents an arrangement interval of the representative points in the vertical direction. Moreover, x' and y' represent relative points of the correction point with respect to one representative point (i,j). The shading correction value at the correction point can be calculated by the following expression.

$$c = \frac{(V-y')(H-x')c_{i,j} + (V-y')x'c_{i+1,j} + y'(H-x')c_{i,j+1} + y'x'c_{i+1,j+1}}{HV}$$

Figure 3B:
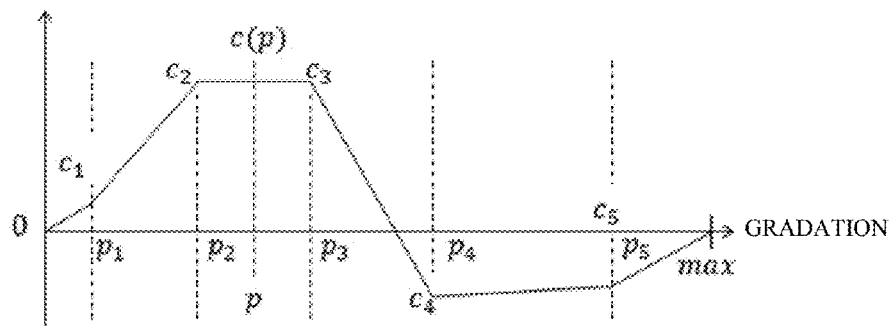

FIG. 3B illustrates shading correction values at an arbitrary correction point at different gradations. The shading correction value at the correction point on the shading correction plane is calculated by the above-described calculation. In FIG. 3B, the specific gradations of multiple (five in the drawing) shading correction planes are respectively represented by $p_1$, $p_2$, $p_3$, $p_4$ and $p_5$, and the shading correction values at a certain correction point on the five shading correction planes are represented by $c_1$, $c_2$, $c_3$, $c_4$ and $c_5$. In FIG. 3B, p represents a gradation at the correction point, and $p_n$ and $p_{n+1}$ ($p_n<p<p_{n+1}$) represent gradations on two shading correction planes above and below the gradation p. Furthermore, $c_n$ and $c_{n+1}$ represents shading correction values obtained on these two shading correction planes.

Then, the shading correction value at the correction point is calculated by the following equation.

$$c(p) = c_n + \frac{p - p_n}{p_{n+1} - p_n}(c_{n+1} - c_n)$$

Figure 3C:
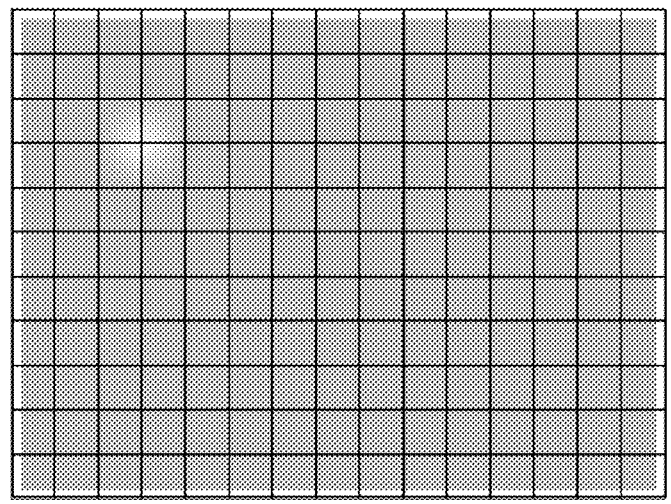
FIG. 3C illustrates an image with the shading correction value set at a correction point (3,3).
Figure 4A:
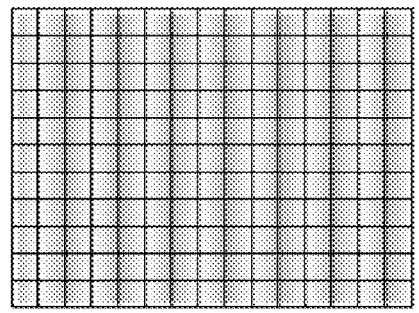
FIGS. 4A to 4E each illustrate a project pattern that sets different shading correction values for each 1, 2, 4 or 8 pixel columns in Embodiment 1.
Figure 4C:
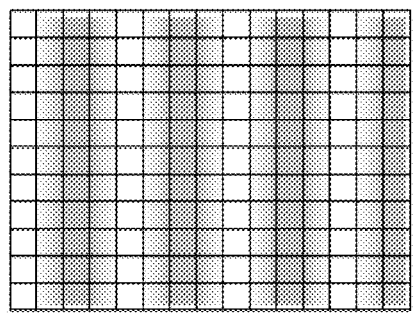
Figure 4B:
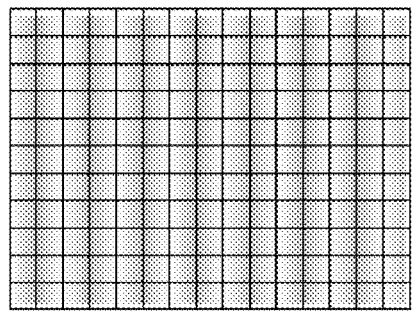
Figure 4D:
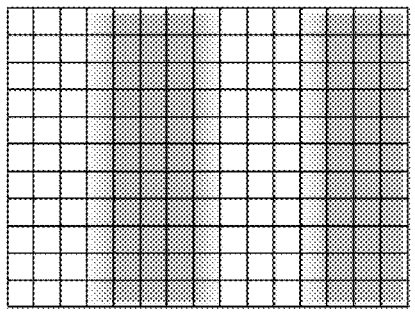
Figure 4E:
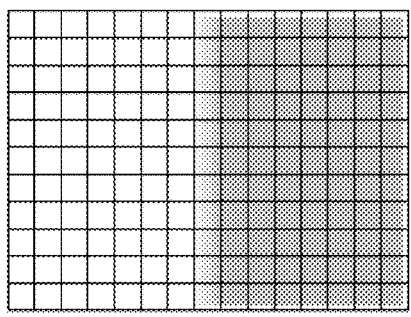
Figure 5A:
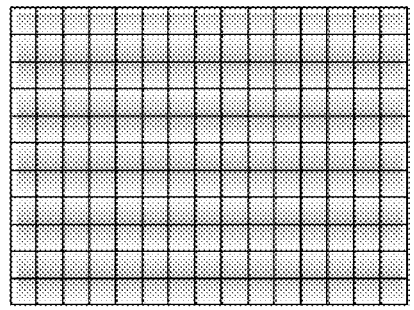
FIGS. 5A to 5E each illustrate a project pattern that sets different shading correction values for 1, 2, 4 or 8 pixel rows in Embodiment 1.
Figure 5C:
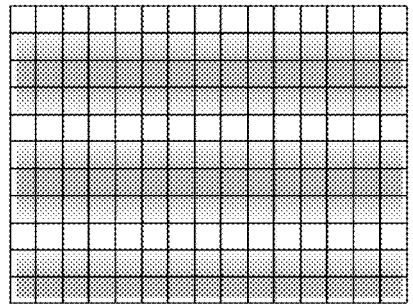
Figure 5B:
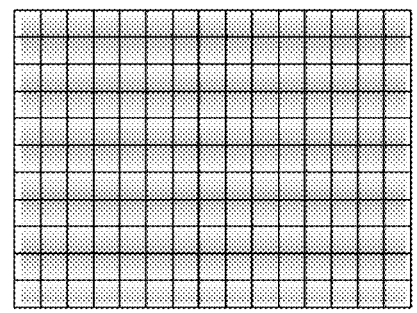
Figure 5D:
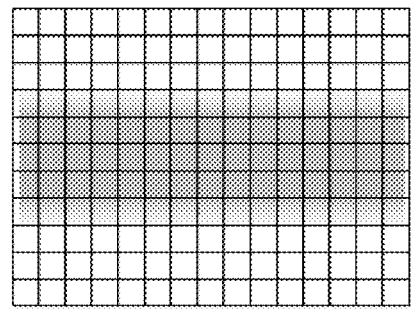
Figure 5E:
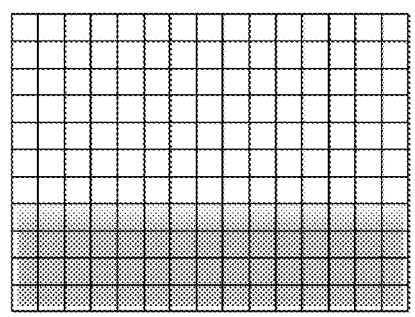

FIG. 3C illustrates an image after the shading correction with a positive shading correction value set at a correction point (3,3). This image simulates a result of adding the shading correction value at the correction point (3,3) on a raster image output from the raster production circuit 211 and having a gradation at which the panel reflectance is 50 [pct].

FIGS. 4A to 4E and 5A to 5E illustrate exemplary patterns as projection patterns of the shading correction values, which are set to each shading correction circuit when a projection image is displayed on the projector 101 for estimating gradations at the correction points from a captured image. The projection images having the illustrated projection patterns are captured by the camera 103, and the captured image are analyzed, thereby determining a correspondence relation between an image capturing coordinate system of the camera 103 and a coordinate system (shading correction coordinate system) of the shading correction circuit.

A method similar to this method is known which calculates a correspondence relation between the coordinate systems from a binary image called a gray code pattern. However, this embodiment can easily display the multiple projection patterns using the shading correction circuit currently mounted. This embodiment can also project an image whose coordinate system has a reliable correspondence at the correction points for which the shading correction values are to be calculated. Furthermore, since this embodiment provides projection patterns for which output from the shading correction circuit changes gradually, a gradation distribution obtained by a background subtraction process corresponds directly to probability. This can reduce error in analyzing which the correction point an area corresponds to. As for an area with a low value of the possibility, which correction point belongs to that area can be more accurately determined by calculating a distance from an area where the corresponding correction point is clearly determined. Use of the method of this embodiment eliminates a necessity that the projection surface is flat when the shading correction is provided, and thereby enables a sufficient shading correction in projection onto a curved surface or a discontinuous surface. Since the gradation distribution corresponding to the correction points is obtained, a true gradation in an area of the captured image in which the obstacle 104 is captured (included), can be estimated by the interpolation process. In addition, since the gradation distribution corresponding to the correction points is obtained, a true gradation in an area of the captured image, in which a color illuminometer 303 is captured, can be estimated by the interpolation process (as described later in Embodiments 3 to 5).

Figure 6:
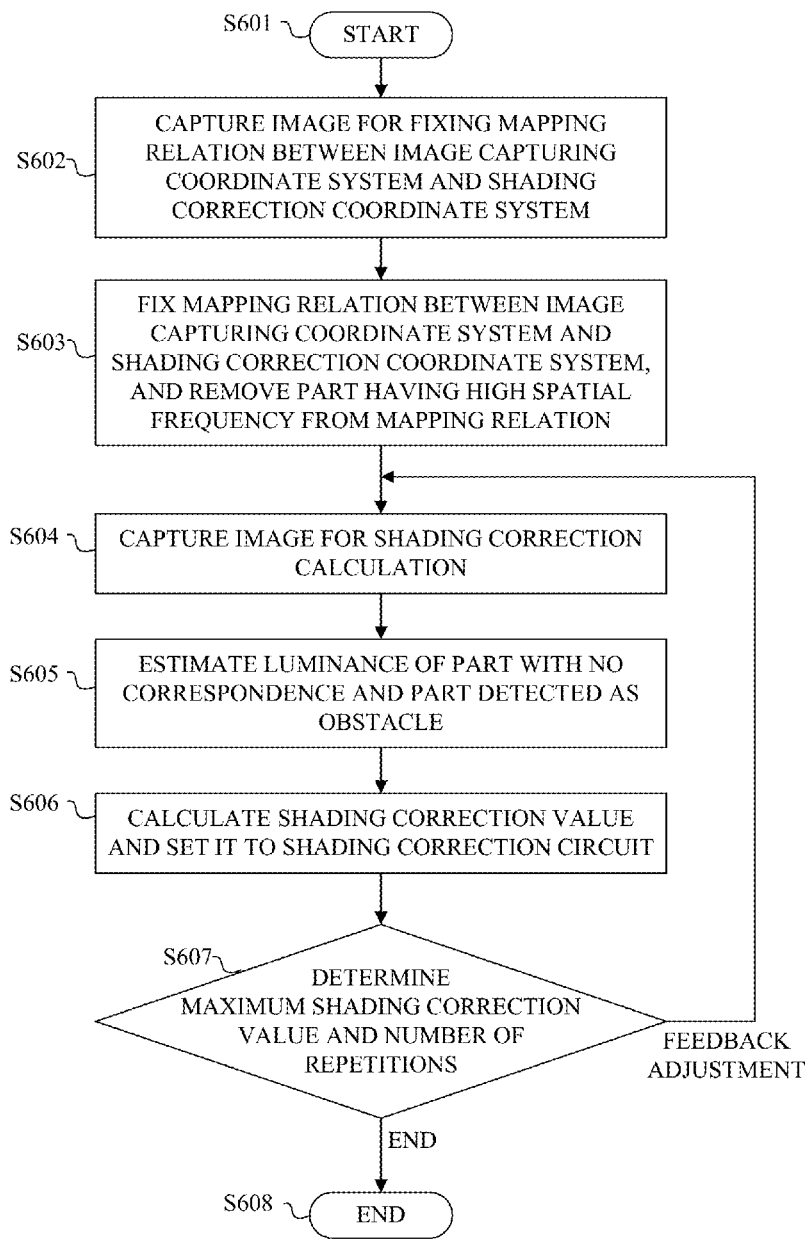
FIG. 6 is a flowchart of a process by the shading correction calculator that is Embodiment 1.

A flowchart in FIG. 6 illustrates a flow of a process (shading correction value calculation method) in this embodiment. This process is executed by the correction value calculator 105 that operates according to a shading correction value calculation program as a computer program, and by the projector 101 and the camera 103 that receive commands from the correction value calculator 105. The correction value calculator 105 serves as a (first/second) mapping calculator, a (first/second) gradation value calculator, a (first/second) correction value calculator.

The overall flow of the process proceeds as follows. First, a correspondence relation (first mapping relation) between the projection image and the captured image obtained by capturing the projection image, that is, between the correction points at which the shading correction values are to be set and pixels included in the captured image, is analyzed. Next, from a result of the analysis, the correspondence relation in an area (hereinafter referred to as "an obstacle area)" of the captured image, in which an obstacle is captured, is removed, and a remaining correspondence relation (second mapping relation) other than the correspondence relation thus removed is used to estimate the gradation value(s) at the correction point(s) included in the obstacle area. Then, the shading correction values to be added at the respective correction points are calculated from the gradation values at all the correction points. The calculation of each shading correction value is repeated until the shading correction value is sufficiently converged. When the shading correction value is sufficiently converged or the calculation is repeated a predetermined number of times before the shading correction value is sufficiently converged, the process is ended. Detailed description of the process will be made below.

Figure 7:
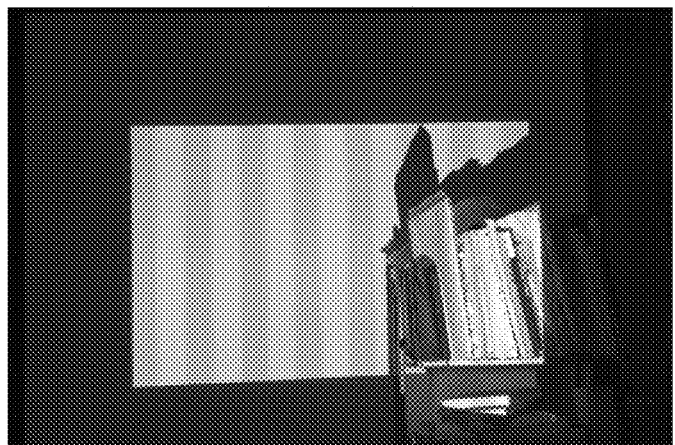
FIG. 7 illustrates an image being adjusted in Embodiment 1.

The correction value calculator 105 starting the process at step S601 causes the camera 103, at step S602, to capture an image in an image capturing range including the projection image projected by the projector 101 and to produce a captured image (first captured image). This image capturing is performed to determine the mapping relation (first mapping relation) as the correspondence relation between the image capturing coordinate system of the camera 103, which is a coordinate system of the captured image, and the shading correction coordinate system of the shading correction circuit. In the determination, the correction value calculator 105 sends, to the projector 101, the shading correction write command to set the shading correction values corresponding to the projection patterns illustrated in FIGS. 4A to 4E and 5A to 5E. Thereby, multiple projection images having the projection patterns are captured. FIG. 7 illustrates an example of the captured image (first captured images) obtained by capturing one of the multiple projection images.

In addition to the projection patterns, image capturing is made on a projection image obtained by setting the shading correction values to zero at all the correction points, and a projection image obtained by setting the shading correction values to a predetermined value other than zero at all the correction points. Hereinafter, a captured image obtained by capturing the former projection image is referred to as "a correction value LO image", and a captured image obtained by capturing the latter projection image is referred to as "a correction value HI image". The correction value HI image and the correction value LO image are each the first captured image.

The captured images thus obtained are used only for a process to fix the mapping relation. Thus, when coordinate relation between each of the shading correction circuits 201 to 203 for R, G and B and the projection image is an approximate one-to-one relation, the projector 101 may project, for example, only a G image to perform the analysis using only a G component of each captured image obtained from the camera 103. In this embodiment, the coordinate relation between each shading correction circuit and the projection image is such an approximate one-to-one relation.

At step S603, the correction value calculator 105 performs the process to fix the mapping relation through conversion of each captured image obtained at step S602 into an image suitable for a resolution of each shading correction circuit. This mapping relation indicates a mapping between pixels of the captured image and the correction points of each of the shading correction circuits 201 to 203, and indicates numbers of pixels (mapped pixels) mapped to the respective correction points.

In this embodiment, to obtain the mapping relation, each pixel value of the captured images obtained by capturing the projection images having the projection patterns illustrated in FIGS. 4A to 4E and 5A to 5E is normalized to a range of 0.0 to 1.0 by using the correction value LO image and the correction value HI image. In the normalization, when a differential pixel value calculated by:

(pixel value of the correction value HI image)−(pixel value of the correction value LO image)

is negative, constant value or less than a threshold calculated from dispersion of the differential pixel values, it is determined that the pixel is not included in the projection image and set as a pixel for which the mapping relation is not to be calculated. Then, any pixel other than the pixel is determined as a pixel included in the projection image, and the mapping relation is calculated therefor.

When the normalized pixel values are represented by xi (i=1, 2, 3, . . . , n), and collectively written as:

$$X = \begin{pmatrix} x_1 \\ x_2 \\ \vdots \\ x_n \end{pmatrix},$$

and
classes of the correction points to which the pixels of the captured image are to be mapped are represented by $\omega_j$, the classes $\omega_j$ can be calculated by the following expression.

$$\underset{j}{\mathrm{argmax}} P(\omega_j \mid X) = \underset{j}{\mathrm{argmax}} \frac{P(X \mid \omega_j) P(\omega_j)}{P(X)}$$

In the above expression, $P(\omega_j)$, $P(X|\omega_j)$ and $P(X)$ inevitably become positive, and $P(X)$ is constant independent of j. Thus, when a magnitude relation among probabilities of the correction points belonging to the respective classes is considered, $P(X)$ does not need to be taken into account. Thus, the above expression can be rewritten as follows.

$$\underset{j}{\mathrm{argmax}} P(\omega_j \mid X) = \underset{j}{\mathrm{argmax}} P(X \mid \omega_j) P(\omega_j)$$

In addition, when $P(\omega_j)$ is taken to be constant to simplify the calculation, $P(\omega_j)$ is a positive constant, and thus the above expression becomes as follows.

$$\underset{j}{\operatorname{argmax}} P(\omega_j \mid X) = \underset{j}{\operatorname{argmax}} P(X \mid \omega_j)$$

Furthermore, the following definition is made.

$$P(X \mid \omega_j) = P_{J1}(x_1) P_{J2}(x_2) \ldots P_{Jn}(x_n)$$

$$\begin{cases} P_{Jk}(x_k) = x_k, \, HI \\ P_{Jk}(x_k) = 1.0 - x_k, \, LO \end{cases}$$

In the definition, HI and LO allow mapping destinations to be determined for all pixel positions because pixel values of each image are set to correspond to bit information for the mapping destinations. This setting is basically the same as that of the gray code. The mapping destinations thus calculated do not necessarily need to correspond to positions on the shading correction circuit, and the calculated mapping destinations may be mapped again to the positions on the shading correction circuit.

The above calculation can provide the correction points to which the pixels of the captured image belongs and the numbers of the mapped pixels mapped to the respective correction points.

Figure 8:
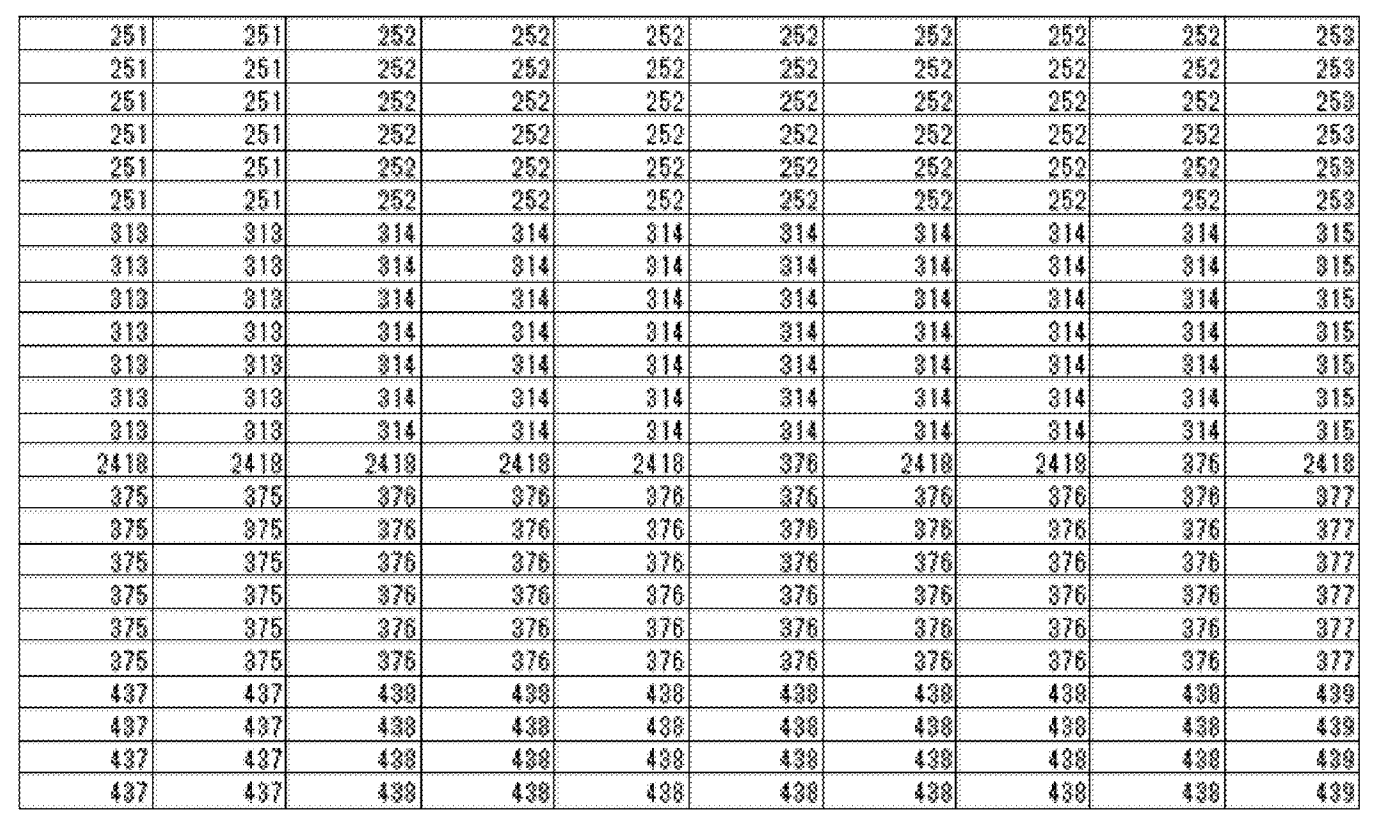

Although the mapping relation is fixed in this manner, an erroneous determination may occur on a boundary between the correction points. FIG. 8 illustrates a table that lists part of the mapping relation obtained by performing the above process on 62×39 correction points arranged in the horizontal and vertical directions. A cell labeled with 2418 represents a pixel processed as an indeterminate pixel. When an area including multiple neighboring pixels whose mapping destinations are mutually identical is referred to as "an identical mapping destination area", pixels that are included in the identical mapping destination and whose number is equal to or less than a predetermined value (for example, 10) are determined to be the indeterminate pixels. The pixel that is determined to be the indeterminate pixel but is in the projection image displayed by the projector 101 is processed so as to belong to any identical mapping destination area. For example, a mapping destination indicated by the value of 2418 is considered. First, the cells labeled with 2418 are distributed in an edge shape, indicating that they are not suitable mapping destinations for the correction points. Moreover, since the 62 correction points are horizontally arranged as described above, the value of 2418 should never appear in the table as a value indicating the position of the correction point. Specifically, the position of the correction point in the vertical direction should be indicated by a value of 62 or close thereto such as 376−314=62 and 314−252=62. Thus, the cell having the value of 2418 can be supposed that it should originally be any one of mapping destinations neighboring thereto. Description will be made of a case of determining whether the value of 2418 should be 314 or 376. In a binary code, 2418 is written as (1001 0111 0010)b, and 314 is written as (0001 0011 1010)b, which is different from 2418 in values at three bits. 376 is written as (0001 0111 1000)b, which is also different from 2418 in values at three bits. If either one of 314 and 376 has a fewer number of changed bits than the other, the one having the fewer number should be determined as a true value to be assigned, which cannot be applied to the above case.

In other words, the values would have no significant difference between their influences, and thus either one of 314 and 376 may be assigned at random. In this embodiment, frequencies of mapping values in an area constituting a surrounding area (5×5 pixels in this embodiment) around 2418 are counted to replace 2418 with a most frequent mapping value. Such a replacing method is one of several methods available, and any of the methods may be used.

The process so far clearly determines the mapping relation from the pixels in the captured image to the correction points and the number of pixels mapped to each correction point. The mapped pixel value is proportional to the gradation, and thus a relative gradation value at the correction point is obtained by dividing a sum of the mapped pixel values by the number of the mapped pixels.

Figure 9:
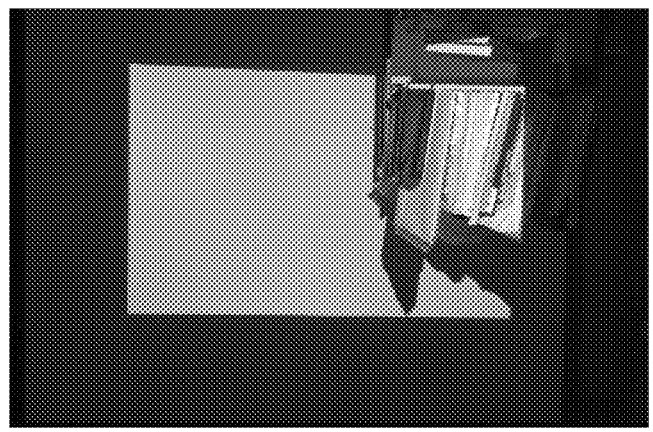
FIG. 9 illustrates an analysis target image in Embodiment 1.
Figure 10A:
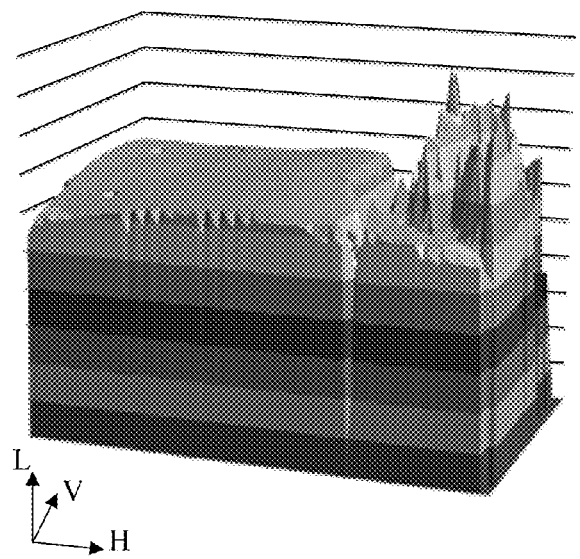
FIG. 10A is a graph of a gradation value of an image obtained by performing a mapping transformation on the analysis target image illustrated in FIG. 9.

FIG. 9 illustrates an exemplary captured image from which the mapping is performed. FIG. 10A illustrates distribution of a relative gradation L in the horizontal direction H and the vertical direction V, which is obtained by executing the mapping from pixels in the captured image illustrated in FIG. 9 to correction points. The captured image illustrated in FIG. 9 is placed upside down with respect to the captured image in FIG. 7 so as to correspond to a gradation direction in FIG. 10A (in which gradation decreases toward a bottom of FIG. 10A).

FIG. 10A illustrates some parts (uneven portions and acute gradation change portions) of the distribution where the gradation does not change smoothly, including a portion affected by the erroneous determination of the mapping relation and a portion where an acute gradation decrease is forcibly processed. Description will be first made of a process in a case where two or more areas have an identical mapping destination. The case where two or more areas have an identical mapping destination includes a case where one correction point is divided by an obstacle into two or more areas in a captured image and a case where an area not to be mapped is included in the two or more areas due to the erroneous determination. In this embodiment, when the correction point is divided into two or more areas, any area other than an area having a highest reliability among the two or more areas is removed. Specifically, a rational determination is performed on the two or more areas.

For example, in a case where two identical mapping destination areas exist, a possible method selects therefrom one area (horizontally and vertically arranged positions corresponding to an identical mapping destination are grouped as an area) including a larger number of pixels. Another possible method calculates, on a premise that areas of 253, 252, 251, 313, 315, 375, 376 and 377 surround the area of 314, a centroid position of each of these areas by weighting each position of these areas as 1. When two or more areas are detected as these surrounding areas, the centroid position of each of the areas is calculated, and one of the areas whose centroid position is closest to that of a target area of 314 is used. In this manner, distances to the surrounding areas are calculated, and a sum of the distances is calculated. Then, one area of 314 whose sum of the distances is smallest is set as a main area, and the other detected areas of 314 are removed. The rational determination is an example, and variations thereof may be used.

Moreover, the mapping relations to the correction points surrounding the correction point to which no pixel is mapped are removed. This removal eliminates any barrier in a later calculation of dispersion. The removal also prevents extreme data from being produced due to an acute gradation change in a later interpolation process.

Figure 10B:
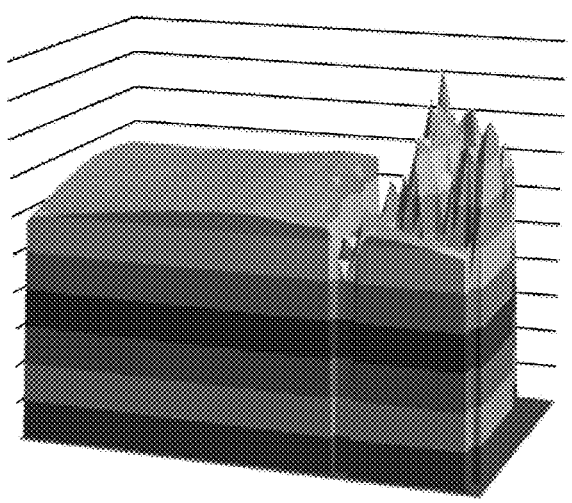
FIG. 10B is a graph of a gradation value of a corrected image in which a mismatch in the mapping transformation is corrected.

FIG. 10B illustrates relative gradation values for correction points after the above-described processes. In FIG. 10B, the uneven portions and acute gradation change portions included in FIG. 10A are removed.

Next, description will be made of detection and removal of part of the mapping relation, which corresponds to the obstacle area. This embodiment basically produces, by estimation, the shading correction value at a position where a signal whose frequency is equal to or higher than a spatial frequency uncorrectable by the shading correction circuit is detected. This is because adverse effects are often caused through correction on a portion where an acute gradation change is present by using a low spatial frequency circuit.

In this embodiment, a dispersion value representing a degree of dispersion of mapped pixel values (gradation values) is calculated for each correction point, as a criterion to determine that a spatial frequency is high for the correction circuit. Then, from the mapping relation (first mapping relation), a mapping relation part for a correction point having a dispersion value equal to or larger than a predetermined real-number multiple of a minimum dispersion value among the dispersion values for the respective correction points (that is, part of the mapping relation, which has a dispersion value larger than that of another part thereof) is removed. In this manner, part of the mapping relation, which corresponds to the obstacle area, is removed to obtain a mapping relation (second mapping relation).

Figure 11:
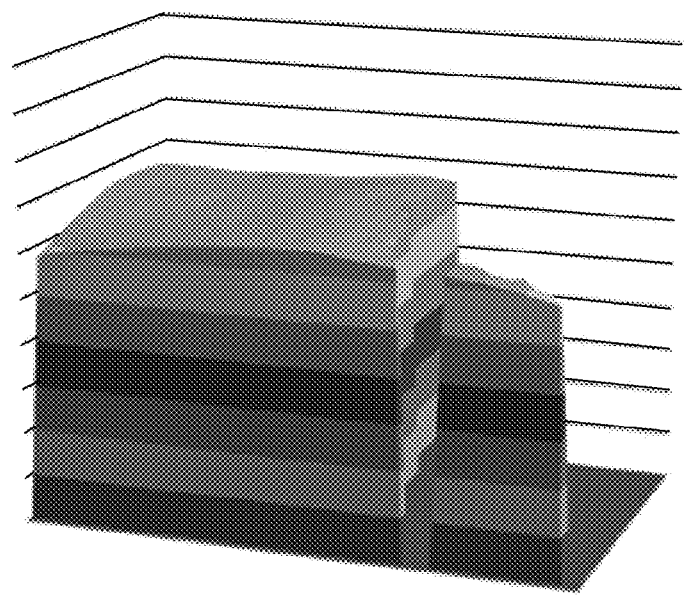
FIG. 11 is a graph of a gradation value of an image obtained by removing part of a mapping relation from the corrected images illustrated in FIGS. 10A and 10B.

FIG. 11 illustrates relative gradations for the correction points processed by using this mapping relation. FIG. 11 illustrates that the obstacle area is sufficiently removed. A standard deviation may be used as an index indicating the degree of dispersion of pixel values. Alternatively, simply removing an area having pixel values largely different from neighboring pixel values is highly effective. Experiments by the inventor found that, with the configuration of this embodiment, an area with a luminance change larger than 2% approximately should be regarded as being affected by the obstacle and part of the mapping relation for the obstacle-affected area should be removed.

At step S604, the correction value calculator 105 causes the projector 101 to project, as a second display image, multiple (10, for example) achromatic color images having gradations in a range between a bright uniform gradation and a dark uniform gradation. Then, the correction value calculator 105 causes the camera 103 to capture the achromatic color images for calculation of the shading correction values. The correction value calculator 105 performs the background subtraction process on the multiple captured images as second captured images that are obtained from the camera 103.

Generally, spectra of RGB primary colors projected by the projector 101 are different from those in a spectral sensitivity of the camera 103. Thus, in this embodiment, a response characteristic of the camera 103 to each of the RGB primary colors (that is, to each single color) projected by the projector 101 are previously analyzed. Then, a color matrix conversion is performed such that a captured image in each primary color obtained by the camera 103 corresponds to the primary color projected by the projector 101. This improves a calculation accuracy of the shading correction values.

When responses of the camera 103 to the RGB primary colors projected by the projector 101 are represented by:

$$\begin{pmatrix} m_{RR} \\ m_{RG} \\ m_{RB} \end{pmatrix}, \begin{pmatrix} m_{GR} \\ m_{GG} \\ m_{GB} \end{pmatrix}, \begin{pmatrix} m_{BR} \\ m_{BG} \\ m_{BB} \end{pmatrix},$$

and
responses of the camera 103 to arbitrary light projected by the projector are represented by:

$$\begin{pmatrix} r_C \\ g_C \\ b_C \end{pmatrix},$$

relative panel reflectances of the projector 101 represented by:

$$\begin{pmatrix} r_P \\ g_P \\ b_P \end{pmatrix}$$

are given by the following expression.

$$\begin{pmatrix} r_P \\ g_P \\ b_P \end{pmatrix} = \begin{pmatrix} m_{RR} & m_{GR} & m_{BR} \\ m_{RG} & m_{GG} & m_{BG} \\ m_{RB} & m_{GB} & m_{BB} \end{pmatrix}^{-1} \begin{pmatrix} r_C \\ g_C \\ b_C \end{pmatrix}$$

The relative panel reflectances are used because it is difficult to obtain reliable absolute panel reflectances from the camera 103. However, correct information on the panel reflectances with respect to at least a central area of the projection image projected by the projector 101 are known, so that use of the correct information with the relative panel reflectances enables sufficiently accurately calculating the shading correction values at the correction points.

At step S605, the correction value calculator 105 performs, on the captured images (second captured images) subjected to the background subtraction process and the color matrix conversion at step S604, a mapping transformation according to the mapping relation (second mapping relation) calculated at step S603. This calculates gradation values (first gradation values) at part of all the correction points in the shading correction coordinate system. For a correction point in the shading correction coordinate system, to which no pixel is mapped, that is, for which a gradation value is not obtained through the mapping transformation, a gradation value (second gradation value) is estimated through the interpolation process using the gradation values obtained from the mapping relation. In this manner, the gradation values (first or second gradation values) are obtained for all the correction points through the mapping transformation or the interpolation process.

In other words, the captured images obtained at step S604 are provided with the mapping transformation for each primary color, and are converted into relative gradation values for the correction points as illustrated in FIG. 11. A part where brightness is not detected in FIG. 11 is a part where the interpolation process is performed.

Figure 12A:
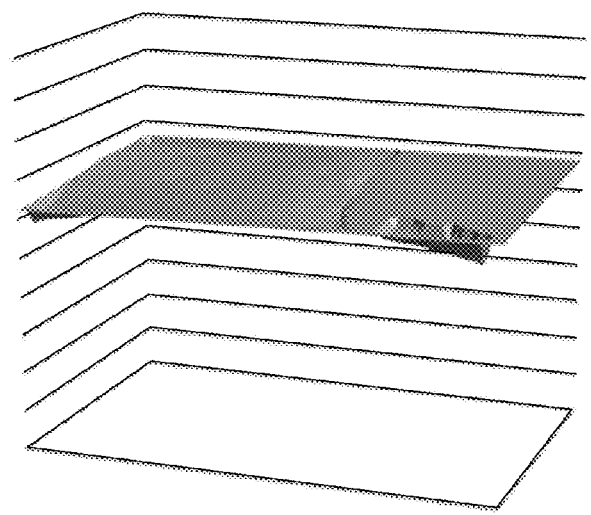
FIG. 12A is a graph illustrating gradation values calculated through an interpolation by a plane approximation in part of the image illustrated in FIG. 11; the part is away from part of the image in which a gradation value is obtained.
Figure 12B:
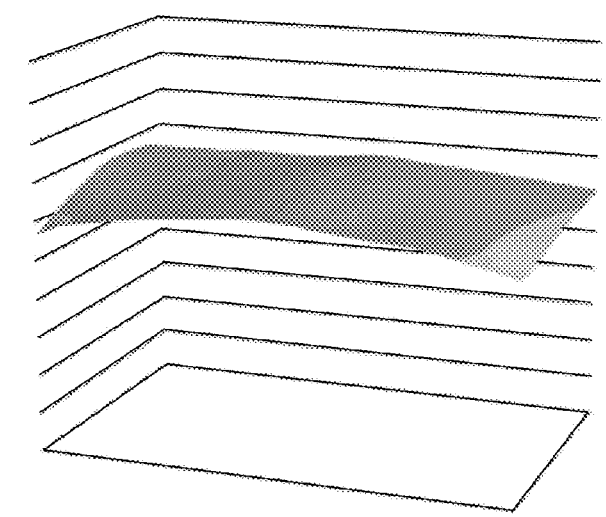
FIG. 12B is a graph illustrating gradation values calculated through an interpolation by a distortion minimization algorithm in part of the image which is close to the part in which the gradation value is obtained.

A simplest method among available interpolation methods is a method of performing a plane approximation using obtained information as illustrated in FIG. 12A. However, this method alone is not an excellent interpolation. FIG. 12B illustrates a result of employing another interpolation method, which looks to human eyes that an excellent interpolation is performed. FIG. 12B illustrates a result of employing an interpolation method that minimizes a gradation distortion. In other words, a relative gradation $c(x_i, y_i)$ at a correction point that minimizes following J is calculated.

$$J = \sum_{i \in D_1} (c(x_1 - 1, y_i) - 2c(x_i, y_i) + c(x_i + 1, y_i))^2 + \sum_{i \in D_2} (c(x_i, y_i - 1) - 2c(x_i, y_i) + c(x_i, y_i + 1))^2$$

In the above expression, $D_1$ and $D_2$ each represent a set of correction points suitable for the calculation.

Figure 13:
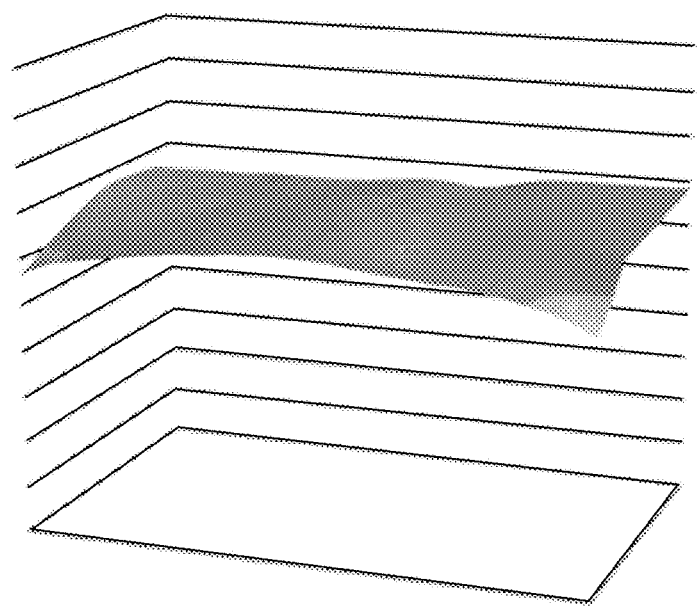
FIG. 13 is a graph illustrating gradation values when a part away from a part for which an interpolation is to be performed is interpolated with a plane approximation interpolation value and the rest part is interpolated by a distortion minimization algorithm.
Figure 14A:
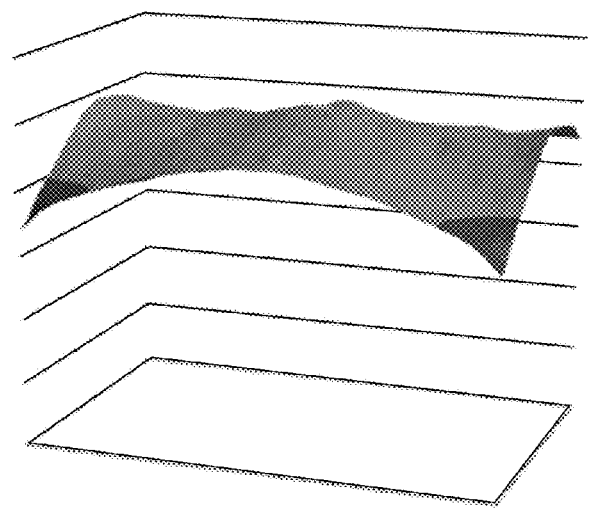
FIG. 14A is a graph illustrating a basis of a typical gradation distribution.
Figure 14B:
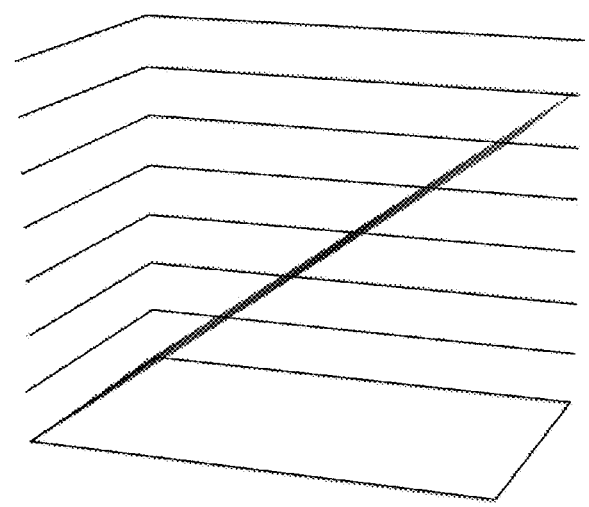
FIG. 14B is a graph illustrating a ramp basis in an H direction.
Figure 15A:
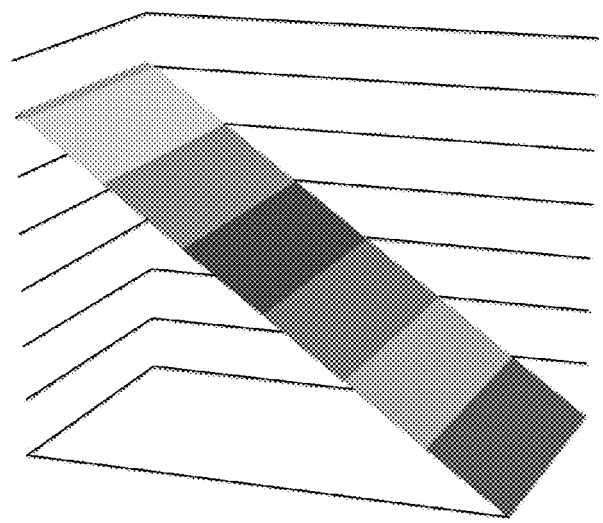
FIG. 15A is a graph illustrating a ramp basis in another H direction.
Figure 15B:
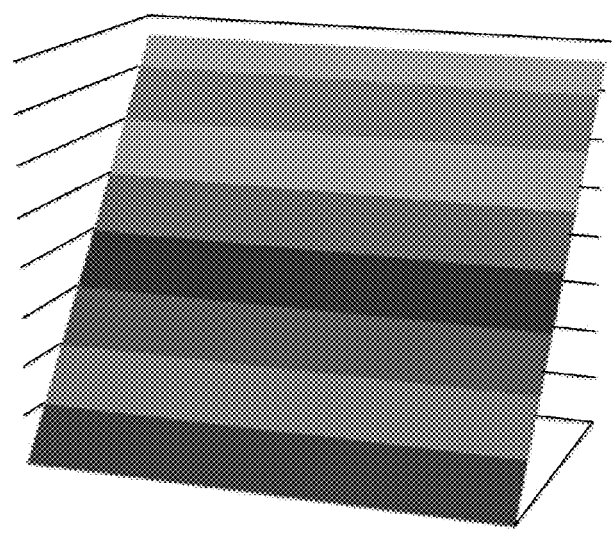
FIG. 15B is a graph illustrating a ramp basis in a V direction.

Another interpolation method is as follows. For the correction point for which the relative gradation value is not obtained, a distance from the correction point for which the relative gradation value is obtained is calculated. Then, for the correction point the distance of which is equal to or longer than a predetermined distance, an interpolation is performed with a plane approximation interpolation value (constant interpolation value) as illustrated in FIG. 12A. On the other hand, for the correction point the distance of which is shorter than the predetermined distance, the above-described algorithm that minimizes the gradation distortion may be applied to obtain a result illustrated in FIG. 13.

Still another interpolation method produces a column vector C of data holding the relative gradation value at the correction point, and calculates an unknown coefficient K from the following expression by using bases $\phi_1$, $\phi_2$, $\phi_3$ and $\phi_4$ illustrated in FIGS. 14A, 14B, 15A and 15B whose coordinate systems correspond to one another.

$$C=(\phi_1\phi_2\phi_3\phi_4)K=E$$

Figure 16A:
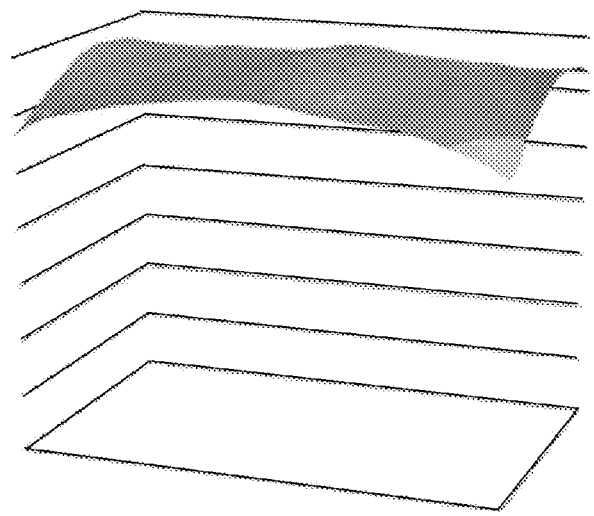
FIG. 16A is a graph illustrating a gradation when an interpolation using a basis and an interpolation by distortion minimization are both applied.

FIG. 16A illustrates a result of an interpolation by using a result of the calculation by this expression in place of the plane approximation.

Figure 16B:
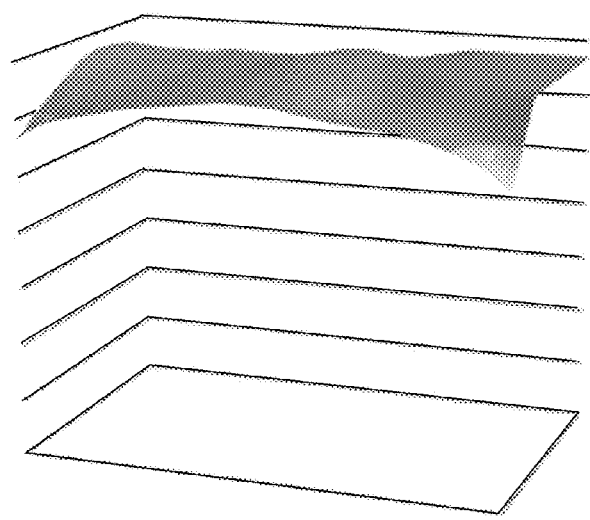
FIG. 16B is a graph illustrating a gradation when a value at a central correction point is applied to a part away from a part where an interpolation is to be performed, and the rest part is interpolated by the distortion minimization algorithm.

Further another method calculates a distance of the correction point for which the relative gradation value is not obtained, from the correction point for which the relative gradation value is obtained. Then, a gradation value at a central correction point is applied without change to the correction point the distance of which is equal to or longer than a predetermined distance. In this method, since the shading correction value for the central correction point is calculated to be zero, an uncorrected shading state can be achieved by setting this value to the correction point the distance of which is equal to or longer than the predetermined distance. For the correction point the distance of which is shorter than the predetermined distance, an interpolation by the algorithm described above is performed to calculate the shading correction value with reduced errors. FIG. 16B illustrates a result of this method.

As just described, various interpolation methods and definitions of the bases are available, and any of them may be used.

In this manner, the correction value calculator 105 obtains a relative gradation distribution (second gradation information) for all the correction points for each of R, G and B. Then, at step S606, the correction value calculator 105 calculates, from the relative gradation distribution and gamma information stored in the information memory circuit 212, the shading correction values to be set to each shading correction circuit.

Description will be made of a method of calculating the shading correction value. The description will be made on a case of obtaining a G shading profile when a maximum panel reflectance in the projector 101 is set for G and performing a correction to bring other G gradations and all R and B gradations closer to the G shading profile. The shading when the maximum panel reflectance is set for G is used as a reference to make an adjustment to make the projection image projected by the projector 101 as bright as possible.

At step S604 described above, the correction value calculator 105 causes the camera 103 to capture white projection images projected with multiple panel reflectances including a panel reflectance of 100%. This provides multiple white captured images and provides relative gradation distributions at mutually corresponding correction points between the white captured images. Then, the panel reflectances of the projector 101 for the respective relative gradation distributions are known, which enables obtaining responses of relative brightnesses at the correction points. As described above, since a target shading profile is known, a correction value for correcting a detected error can be calculated uniquely from the response characteristics obtained for the respective correction points.

At step S607, the correction value calculator 105 monitors a maximum shading correction value among the shading correction values calculated at step S606 and number of repetitions of a loop from step S604 to step S607. When the maximum shading correction value is converged to a value equal to or smaller than a predetermined value or when the number of repetitions of the loop reaches a predetermined number of times, the process is ended. Otherwise, the process returns to step S604 and repeats the calculation of the shading correction values. When a single loop from step S604 to step S607 provides a sufficient accuracy, the loop does not need to be repeated.

The correction value calculator 105 writes (stores), to the information memory circuit 212 of the projector 101, the calculated shading correction values as the initial shading correction values to be set to the shading correction circuits 201 to 203.

Embodiment 2

Next, description will be made of Embodiment (second embodiment) of the present invention. In this embodiment, an interpolation in the calculation of the shading correction values will be described. Components in this embodiment common to those in Embodiment 1 are denoted by the same reference numerals as those in Embodiment 1, and descriptions thereof will be omitted.

Figure 17:
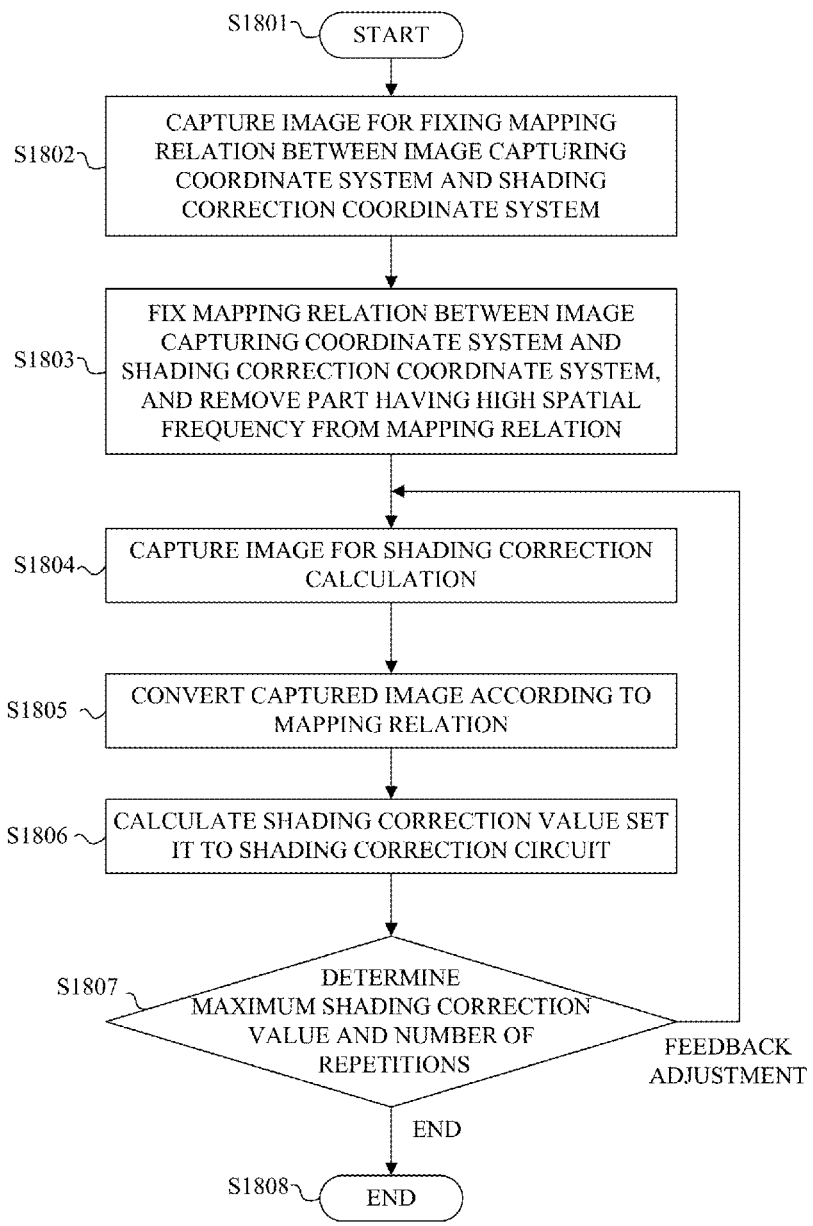
FIG. 17 is a flowchart of a process by a shading correction calculator that is Embodiment 2.

A flowchart in FIG. 17 illustrates a flow of a process in this embodiment. The process is executed by the correction value calculator 105 and the projector 101 and the camera 103 that have received commands from the correction value calculator 105.

The correction value calculator 105 starting the process at step S1801 performs the same processes at steps S1802, S1803 and S1804 as those at steps S602, S603 and S604 in Embodiment 1 (FIG. 6).

At step S1805, the correction value calculator 105 calculates, without performing the interpolation process performed at step S605 in Embodiment 1, the relative gradation value only at the correction point for which the mapping relation is defined, leaving the relative gradation value undefined at the correction point for which the mapping relation is not defined.

At step S1806, the correction value calculator 105 calculates, from the relative gradation value (first gradation value) calculated at step S1805 and the gamma information recorded in the information memory circuit 212, the shading correction value to be set to each shading correction circuit (201 to 203). Specifically, the correction value calculator 105 calculates, from the relative gradation value calculated at step S1805, the shading correction value (first correction value) at the correction point in part of the shading correction coordinate system (all the correction points).

In this calculation, since the gamma information (a gamma table) basically corresponds to a characteristic of a central area of the captured image, an appropriate correction cannot be performed when no relative gradation value at the correction point is available in the central area of the captured image. This case may be processed as an error, or may be dealt with by a method of performing the calculation using the relative gradation value at the correction point closest to the central area as the relative gradation value at the central area. Another method uses the relative gradation value at the central area of the captured image by performing the process described above in Embodiment 1. In this embodiment, such a case is processed as an error.

Description will be made of a process when the relative gradation value at the correction point in the central area is obtained at step S1805. The correction value calculator 105 normalizes the relative gradation values at the correction points using the gamma table recorded in the information memory circuit 212. Specifically, the correction value calculator 105 converts, by referring to the gamma table, gradations that correspond to relative luminance values and are obtained from the captured image, into panel reflectances. Then, the correction value calculator 105 multiplies the relative luminance values at the correction points by a value obtained by dividing the panel reflectances by the relative gradation value at the central area to provide an image whose relative luminance values at the correction points are converted into the panel reflectances.

The panel reflectances used in this calculation can be obtained without an inverse calculation of gradations at which a light-modulating panel is driven. In many cases, the panel reflectances are managed in order to obtain projection images at specific panel reflectances. Since gradation values are calculated by referring to the gamma table depending on the managed panel reflectances so as to project raster images, the panel reflectances used in the calculation are previously known. When a gradation value is specified, a panel reflectance corresponding thereto is converted by using the gamma table.

The relative panel reflectance thus calculated at each correction point can be used to estimate an actual panel reflectance (hereinafter referred to as "an output panel reflectance") at the correction point through, for example, a spline interpolation for any input panel reflectance.

The correction value calculator 105 calculates, from information on the relative panel reflectances at the correction points obtained as described above, the shading correction values to be provided to each shading correction circuit. Specifically, since the correction point in the central area is used as a reference, the shading correction value in the central area is fixed to zero.

For example, in a case where a shading correction value corresponding to a reflectance of 100% of the light-modulating panel for G is predetermined to be zero, a panel reflectance of the light-modulating panel for G at the correction point at which the reflectance of 100% is set is used as a reference. In this case, for each correction point and for each light-modulating panel, an ideal reflectance is calculated for a panel reflectance at each estimated gradation so that an ideal panel reflectance is obtained on a shading correction plane that is placed at a specific panel reflectance (gradation). Then, a correction value providing the ideal reflectance is calculated by using the known gamma information. This calculation fixes the shading correction values set on the shading correction plane. Such a calculation is performed on each shading correction plane for each light-modulating panel to set the shading correction values for each color.

The shading correction values can be set only for the correction points at which the panel reflectances can be previously calculated, and the shading correction values are not set for the correction points at which the panel reflectances cannot be calculated. In this embodiment, for the correction points for which the shading correction values are not set, in a similar manner to the interpolation process on the gradation values described in Embodiment 1, the shading correction values (second correction values) are calculated through the interpolation process using the set shading correction values.

For example, in the interpolation process, a distance between from an area where the shading correction value is obtained to a target area of the interpolation process is calculated. When the distance is equal to or larger than a predetermined distance, an interpolation using a constant interpolation value is performed. When the distance is shorter than the predetermined distance, an interpolation that minimizes the gradation distortion due to the shading correction is performed.

In the description, the shading correction plane may be disposed at a gradation previously determined depending on the panel reflectance, or may be disposed at a gradation having a large shading amount.

At step S1807, the correction value calculator 105 ends this process when a maximum shading correction value among the shading correction values calculated at step S1806 is converged to a predetermined value or less or when number of repetitions of a loop from step S1804 to step S1087 reaches a predetermined number of times. The maximum shading correction value is desirably to be a value converted from the panel reflectance, but may be the shading correction value itself. Otherwise, the process returns to step S1804. Similarly to Embodiment 1, when a single loop from step S1804 to step S1807 provides a sufficient accuracy, the loop does not need to be repeated.

The correction value calculator 105 writes the obtained shading correction values to the information memory circuit 212 of the projector 101 as the initial shading correction values set to the shading correction circuits 201 to 203.

Each of the above embodiments describes the case of using, as an image display apparatus, the projector that displays an image by projecting a projection image on a display (projection) surface. However, the shading correction value calculation methods described in the above embodiments are applicable to a case of using a direct-view display.

According to Embodiments 1 and 2, when a blocking object (obstacle) exists between the display surface and the image capturing apparatus that captures a display image displayed on the display surface or when the display surface has distortion and lack, a correction value for sufficiently correcting shading (luminance unevenness and color unevenness) of the display image by using the captured images can be calculated.

Embodiment 3

Figure 18A:
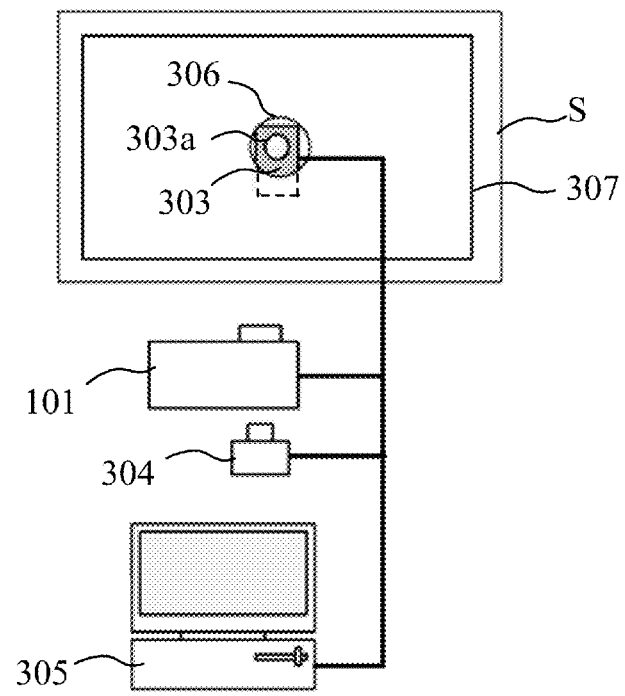
FIGS. 18A and 18B illustrate an arrangement of a gradation conversion characteristic and shading correction calculator that is Embodiment 3, a projector, a camera, a screen and a color illuminometer.
Figure 18B:
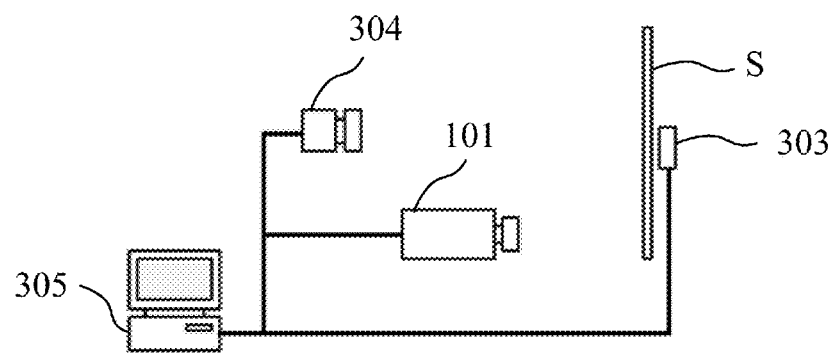

FIGS. 18A and 18B illustrate an image projection apparatus (an image display apparatus; hereinafter referred to as "a projector") 101 that is identical to the projector 101 shown in FIG. 1B, a gradation conversion characteristic/shading correction value calculation apparatus (hereinafter simply referred to as "a calculator") 305 that is Embodiment 3 (third embodiment) of the present invention, and an image capturing apparatus (hereinafter referred to as "a camera") 304. FIGS. 18A and 18B also illustrate a screen S as a projection surface (display surface), and a color illuminometer 303 as a chromaticity measurer disposed at a back of a hole 306 formed at a central part of the screen S. These components from the projector 101 to the color illuminometer 303 constitute an image projection system. The projector 101 in this embodiment also includes the circuits 201 to 106 and 210 to 214 and the light-modulating elements 207 to 209 illustrated in FIG. 1B.

The projector 101 drives a light-modulating element described later depending on a video signal (input image signal) and displays a projection image 307 as a display image by projecting light modulated by the light-modulating element onto the screen S. The color illuminometer 303 measures chromaticity and illumination intensity substantially at a center of the projection image 307 projected onto the screen S.

The camera 304 captures an image capturing range (angle of view) including the projection image 307 on the screen S and produces the captured image.

The calculator 305 includes a personal computer and acquires information on the chromaticity and illumination intensity obtained through the measurement from the color illuminometer 303. The calculator 305 calculates, by using the chromaticity information, a gradation conversion characteristic for converting an input gradation as a gradation (luminance) of the input image signal into a gradation of the projection image, in other words, a gamma correction characteristic for converting the input gradation into a gradation suitable for a gradation characteristic of the light-modulating panel. The calculator 305 further calculates, by using the captured image acquired from the camera 304, a correction value (hereinafter referred to as "a shading correction value") for correcting shading such as luminance unevenness and color unevenness included in the projection image 307.

As illustrated in FIGS. 18A and 18B, the projection image projected onto the screen S needs to be captured by the image capturing apparatus 304 to calculate the shading correction value. On the other hand, calculation of the gamma correction characteristic requires use of the color illuminometer 303, and the color illuminometer 303 needs to receive light from the projection image 307 projected by the projector 101. For this purpose, the hole 306 is formed in the screen S as illustrated in FIGS. 18A and 18B, and a light-receiver (sensor) 303a of the color illuminometer 303 disposed at the back of the screen S is exposed through the hole 306. The color illuminometer 303 may be disposed in front of the screen S (between the screen S and the camera 304). However, in these cases, an image of the color illuminometer 303 is captured in the captured image obtained by the camera 304, and thus use of the captured image, in an area of which the color illuminometer 303 is captured, does not allow calculation of the shading correction values for sufficiently correcting the shading of the projection image.

In this embodiment, in the calculation of the shading correction values, some of the shading correction values corresponding to the area of the captured image where the color illuminometer 303 is captured are estimated (interpolated). This enables efficiently calculating the shading correction values for sufficiently correcting the shading of the projection image in a short time without removing (with no need to remove) the color illuminometer 303.

Although in this embodiment the calculator 305, the camera 304 and the projector 101 are separated from one another, they may be integrally configured as an apparatus (projector).

Figure 19:
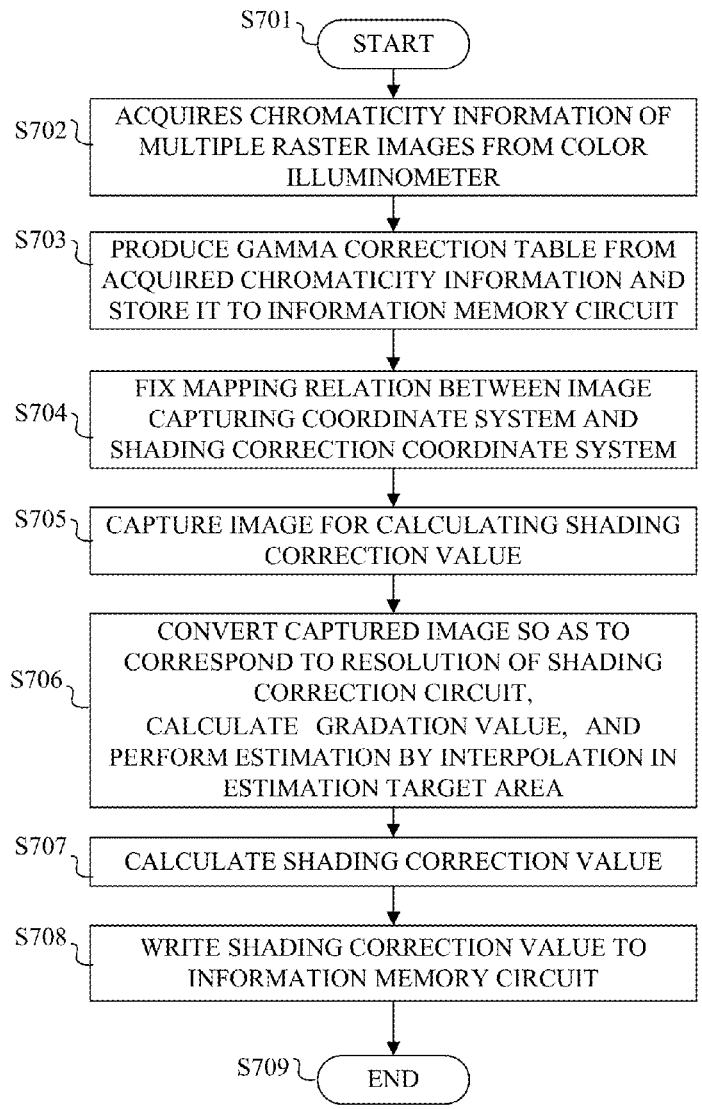
FIG. 19 is a flowchart of a process by the calculator that is Embodiment 3.

A flowchart in FIG. 19 illustrates a flow of a process (gradation conversion characteristic/shading correction value calculation method) executed by the calculator 305 in this embodiment. The calculator 305 operates according to a gradation conversion characteristic/shading correction value calculation program as a computer program and performs the process. The calculator 305 serves as a gradation conversion characteristic calculator, a (first/second) image acquirer, a (first/second) mapping calculator, a (first/second) gradation value calculator and a (first/second) correction value calculator.

The overall flow of the process proceeds as follows. First, the calculator 305 produces, from the chromaticity information acquired from the color illuminometer 303 and the captured image acquired from the camera 304, information provided to the gamma correction circuits 204 to 206 and information provided to the shading correction circuits 201 to 203. The information provided to the gamma correction circuits 204 to 206 is information on the gamma correction characteristic such as a gamma correction table and a 2.2 characteristic table given depending on setting of an image mode such as sRGB mode, and is stored in the information memory circuit 212. In this embodiment, the gamma correction characteristic information is stored as a 1DLUT, but may be stored as a 3DLUT.

The information provided to the shading correction circuits 201 to 203 is information on the shading correction values for reducing partial coloring in the projection image on the screen S, which is caused by the light-modulating panels 207 to 209 and optical members in the projector 101. The shading correction value information is stored in the information memory circuit 212. Some of the shading correction values reduce errors of an actual shading profile relative to a reference shading profile.

An overview of a procedure of producing the shading correction values is as follows. First, a correspondence relation (first mapping relation) between the projection image 307 and the captured image obtained by capturing the projection image, in other words, correction points at which the shading correction values are set and pixels included in the captured image is analyzed. Next, on a basis of a result of the analysis, the correspondence relation in an estimation target area of the captured image, in which the color illuminometer 303 (and the hole 306) is captured, is removed. Then, a correspondence relation (second mapping relation) after the removal is used to estimate gradation values at the correction points in the estimation target area by an interpolation process. Then, the shading correction value to be provided to each correction point is calculated from the gradation values at all the correction points. The procedure will be described below in detail.

The calculator 305 starting the process at step S701 causes the projector 101, at step S702, to produce a raster image having a gradation specified by the calculator 305 and to project the raster image. Then, the calculator 305 causes the color illuminometer 303 to measure chromaticity of the projected raster image and acquires the chromaticity information as a result of the measurement from the color illuminometer 303. In this case, conversions by the gamma correction circuits 204 to 206 and the shading correction circuits 201 to 203 are set to be disabled. Thus, R, G and B panel drivers (not illustrated) that drive the respective light-modulating panels 207 to 209 are supplied with digital data with no bit shift or appropriate bit shift. In this embodiment, the calculator 305 causes the projector 101 to project multiple raster images while changing the gradation values (hereinafter each referred to as "a drive gradation") provided to the R, G and B panel drivers and acquires the chromaticity information of each raster image. In the raster image projection, the chromaticity information for the drive gradation of one light-modulating panel is acquired while the drive gradations of the other light-modulating panels are set to a predetermined drive gradation (zero, for example). For example, when the chromaticity information for the drive gradation provided to the R panel driver is acquired from the color illuminometer 303, the drive gradations of the G and B panel drivers are set to zero.

Figure 20:
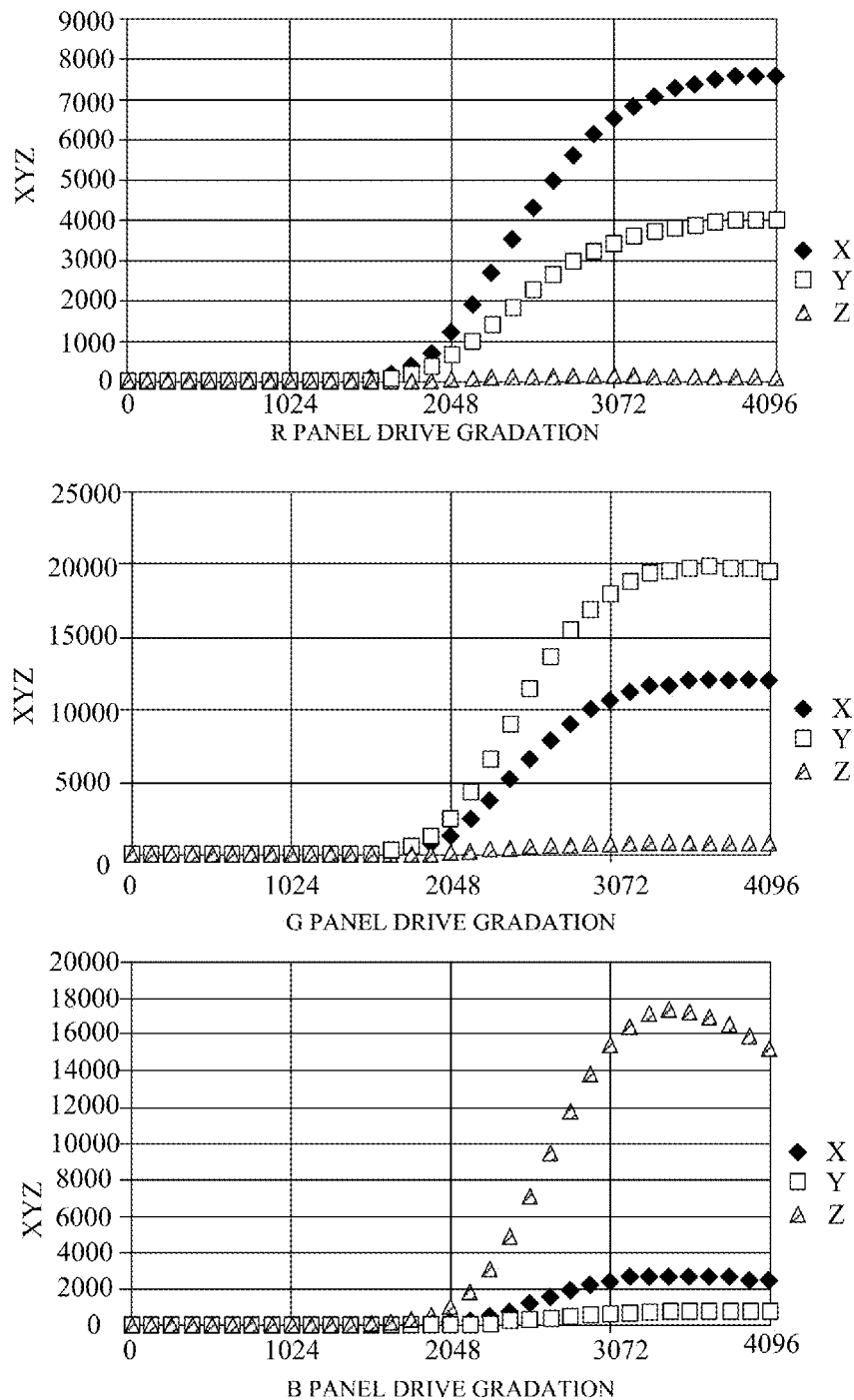
FIG. 20 illustrates a measurement result (chromaticity information) obtained by a color illuminometer in Embodiment 3.

FIG. 20 illustrates an example of the chromaticity information acquired at the present step. Each of the R, G and B panel driver has a digital/analog convertor (DAC) of 12 bits, which is used to control its panel reflectance by converting the digital data of gradations 0 to 4095 shown along a horizontal axis of FIG. 20 into corresponding analog voltages. When each light-modulating panel is a DMD, the DMD is driven with a duty ratio corresponding to the digital data.

FIG. 20 illustrates an example of the chromaticity information (tristimulus values X, Y, and Z in an XYZ color system) along the vertical axis, which is acquired from the color illuminometer 303, at different drive gradations spaced at 128 gradations from 0 to 4095. However, the gradation 4096 is substituted with the gradation 4095. As described above, the chromaticity information for the drive gradations of one light-modulating panel is acquired while the drive gradations of the other light-modulating panels are set to zero.

At step S703, the calculator 305 produces, using the chromaticity information (measured chromaticity) of the drive gradations of each light-modulating panel, which is acquired from the color illuminometer 303 at step S702, a data table listing the above-mentioned gamma correction characteristic for converting the measured chromaticity into a desired target chromaticity. Hereinafter, the data table listing the gamma correction characteristic is referred to as "a gamma correction table". The gamma correction table is stored in the information memory circuit 212.

At the previous step S702, the calculator 305 performs an interpolation process to produce the chromaticity information for all the drive gradations providable to the light-modulating panel. The chromaticity information acquired from the color illuminometer 303 inevitably has an error, and thus a smooth interpolation using an estimation model is desirably performed by using the acquired chromaticity information instead of a divisional interpolation using, for example, a spline interpolation. In this embodiment, the smooth interpolation is achieved by appropriately weighting an error between a distortion amount and a sampled value. Specifically, in this embodiment, an evaluation value J is defined as follows:

$$J = w \sum_{D_1 \ni i} (\hat{x}_i - 2\hat{x}_{i+1} + \hat{x}_{i+2})^2 + \sum_{D_2 \ni i} (\hat{x}_i - x_i)^2,$$

and
an estimation value at which this evaluation value becomes minimum is set as an interpolation value of the chromaticity information. The method of interpolating the chromaticity information is not limited to this.

Figure 21:
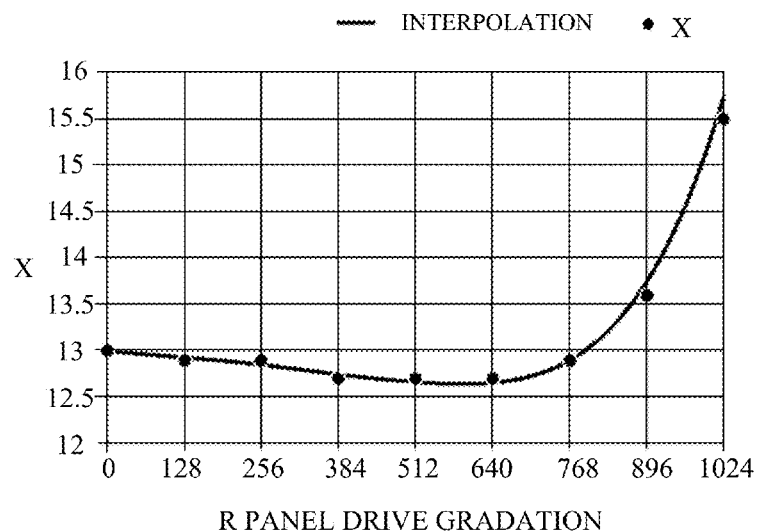
FIG. 21 illustrates an interpolation result of the chromaticity information in Embodiment 3.

FIG. 21 is a graph of the chromaticity information in an XYZ chromaticity coordinate, which is plotted against the drive gradations produced through the interpolation process. In the graph, a horizontal axis represents the drive gradation of the R light-modulating panel, and a vertical axis represents the stimulus value X obtained by the color illuminometer 303.

At step S703, the calculator 305 searches, from a response characteristic of the chromaticity information for the drive gradations of the light-modulating panel obtained as described above, for a combination of the gradation values (hereinafter referred to as "a gradation value combination") for achieving a gamma correction characteristic (hereinafter referred to as "a target gamma correction characteristic") to obtain the target chromaticity. In this search, preacquiring an inverse function of an illumination intensity (Y) for the drive gradations of each light-modulating panel allows roughly calculating the gradation value combination with a simple matrix calculation. Repeating this process enables more accurately calculating the gradation value combination, and in most cases the gamma correction characteristic can be obtained with a sufficient accuracy as a solution of this repetitive process. To more accurately calculate the gamma correction characteristic, achievable gradation value combinations may be searched for near the above-mentioned solution so that a gradation value combination having a smallest error is obtained as a finally obtained gradation value combination.

This search is discretely performed for the target gamma correction characteristic, and then an interpolation process such as the spline interpolation is performed to produce a final gamma correction table. The calculator 305 writes (stores) the produced gamma correction table to the information memory circuit 212 and then ends the process of step S703.

At step S704, the calculator 305 performs a process to fix the first mapping relation as the correspondence relation between an image capturing coordinate system of the camera 304, which is a coordinate system of the captured image produced by the camera 304, and the shading correction coordinate system of each shading correction circuit. Specifically, the calculator 305 first causes the projector 101 to project multiple projection images having the projection patterns illustrated in FIGS. 4A to 4E and 5A to 5E and causes the camera 304 to capture the multiple projection images. Then, the calculator 305 acquires, from the camera 304, the multiple captured images (first captured images) produced by image capturing of these multiple projection images. The calculator 305 also causes the projector 101 to project a projection image having a projection pattern obtained by setting the shading correction values at all the correction points to zero and then causes the camera 304 to capture this projection image to acquire a zero correction value image. The calculator 305 further causes the projector 101 to project a projection image having a projection pattern obtained by setting shading correction values at all the correction points to a specific value other than zero and then causes the camera 304 to capture this projection image to acquire a specific correction value image. These zero correction value image and specific correction value image are included in the first captured image. The projection patterns and number thereof are varied with a resolution of the shading correction circuits 201 to 203.

To calculate the first mapping relation, the calculator 305 normalizes pixel values of the captured images obtained by image capturing of the projection images having the projection patterns illustrated in FIGS. 4A to 4E and 5A to 5E, to a range of 0.0 to 1.0 by using the zero correction value image and the specific correction value image. The normalized pixel values have values close to zero and to one, and thus the first mapping relation as the correspondence relation between the coordinate system (image capturing pixel positions) of each captured image and the shading correction coordinate system (correction points) can be fixed from a bit pattern as a combination of these normalized pixel values.

At step S705, the calculator 305 produces at least one correction value calculation image which is used to calculate the shading correction value and whose gradation is set on a basis of the gamma correction table produced at step S703. Then, the calculator 305 causes the projector 101 to project the correction value calculation image and causes the camera 304 to capture the projected correction value calculation image.

In the production of the correction value calculation image, the illumination intensities (Y) for the drive gradations provided to the respective light-modulating panels are obtained at step S703. Thus, the calculator 305 produces, from information on relations between the drive gradations and the illumination intensities, at least one correction value calculation image for which panel reflectances of the light-modulating panels are set to be substantially identical to one another and causes the projector 101 to project this produced correction value calculation image. Following this, the calculator 305 causes the camera 304 to capture the projected correction value calculation image. When multiple correction value calculation images are produced and captured, different drive gradations are used between these multiple correction value calculation images. The calculator 305 acquires the captured images (second captured images; hereinafter each referred to as "a correction value calculation captured image") from the camera 304.

Each correction value calculation captured image acquired from the camera 304 includes the color illuminometer 303 captured, which is used from the start of the present procedure. Thus, as described above, the shading correction values allowing the sufficient shading correction cannot be calculated for the area of the captured image where the color illuminometer 303 is captured.

Figure 22:
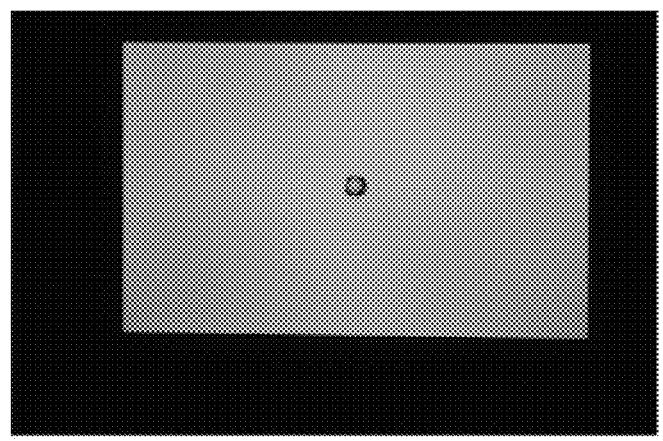
FIG. 22 illustrates an example a captured image for correction value calculation in Embodiment 3.

FIG. 22 illustrates a correction value calculation captured image obtained by capturing an achromatic color image as a correction value calculation projection image, which is projected while the sensor of the color illuminometer 303 is exposed through the hole 306 formed in the screen S as illustrated in FIGS. 18A and 18B.

At step S706, the calculator 305 converts the at least one correction value calculation captured image acquired at step S705 such that its resolution matches (corresponds to) those of the shading correction circuits 201 to 203 on a basis of the first mapping relation fixed at step S704. The calculator 305 performs this conversion on the correction value calculation captured image independently for each of R, G and B and acquires a gradation distribution (luminance distribution) for each color.

In this conversion, numbers of pixels of the captured image, which are mapped to the respective correction point of each shading correction circuit are mutually different. Thus, the calculator 305 sets (calculates) a threshold (predetermined value) for the number of pixels mapped to the correction point. When the number of pixels mapped to the correction point is equal to or smaller than the threshold, the calculator 305 calculates a gradation value at the correction point through an interpolation process described later.

On the other hand, when the number of pixels mapped to the correction point is larger than the threshold, the calculator 305 calculates a degree of dispersion (dispersion value) of the gradation values of the mapped pixels. Then, when the dispersion value is equal to or larger than a predetermined value or when the dispersion value is larger than that in another area, the calculator 305 removes, from the first mapping relation, a mapping relation part corresponding to that correction point. This provides the second mapping relation obtained as the estimation target area by removing part of the mapping relation from the first mapping relation; the part corresponds to the color illuminometer 303. A standard deviation may be used as an index indicating the degree of dispersion of the gradation values.

The calculator 305 performs, on the correction value calculation captured images (second captured images), a mapping transformation by using the second mapping relation. This calculates first gradation values as the gradation values at the correction points (in other words, part of the shading correction coordinate system) other than the estimation target area. Then, the calculator 305 performs, on the correction points in the estimation target area, an interpolation process (described later) using the first gradation values and estimates gradation values (second gradation values). In this manner, the first and second gradation values as the gradation values at all the correction points are obtained through the mapping transformation or the interpolation process (gradation interpolation).

Figure 23A:
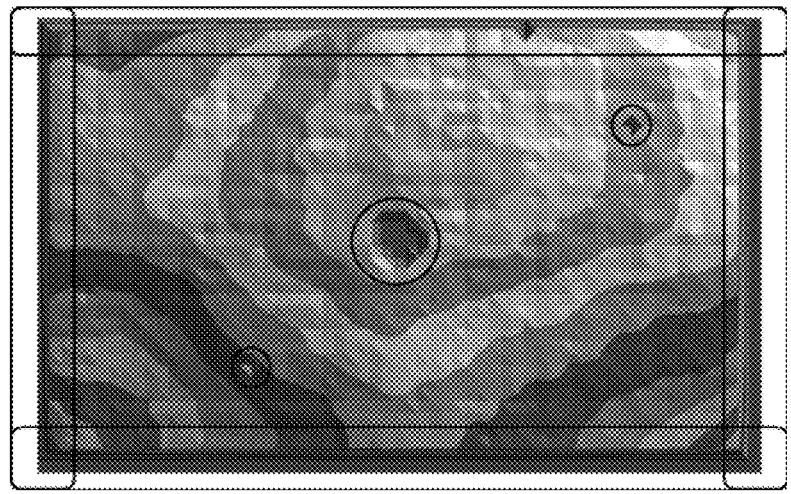
FIGS. 23A and 23B illustrate gradation distributions (before and after an interpolation) of a captured image for correction value calculation in Embodiment 3.

FIG. 23A illustrates an example of the gradation distribution corresponding to the resolution of each shading correction circuit, which is calculated in the above-described process. FIG. 23A illustrates a gradation distribution in which the gradation values in an estimation target area that is a target of the gradation interpolation are set to zero. In FIG. 23A, each of areas enclosed by solid circles shows the estimation target area. After this gradation distribution is produced, the gradation values in an area within a range of a predetermined distance from the estimation target area may be calculated through the interpolation process as necessary.

Marginal areas enclosed by black lines in FIG. 23A show areas including the correction points of each shading correction circuit, for which the gradation values cannot be calculated. As described above, the gradation value is set by capturing, with the camera 304, a reflected light from the screen S among a projection light projected by the projector 101 and by calculating the gradation value corresponding to a luminance at the correction point on the shading correction circuit. However, generally, since a correction target area of the shading correction circuit is larger than a projection area projected by the projector, gradation values are not necessarily set for all the correction points. Thus, the gradation values in the marginal areas enclosed by the black lines in FIG. 23A need to be calculated by an estimation using a technique such as an interpolation.

Figure 23B:
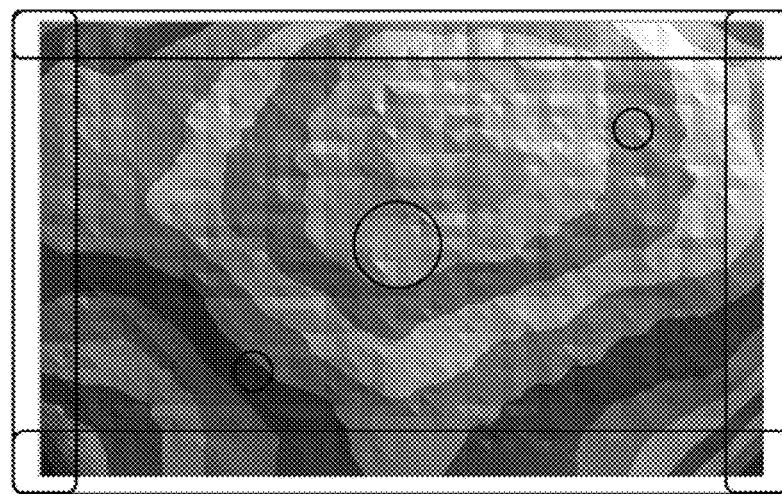

FIG. 23B illustrates a gradation distribution obtained by performing the interpolation process on the gradation distribution illustrated in FIG. 23A. The interpolation process in this embodiment also calculates an estimation value that minimizes the following evaluation value J.

$$J = \omega_1 \sum_{D_1 \ni (x,y)} (\hat{g}_{x,y} - 2\hat{g}_{x+1,y} + \hat{g}_{x+2,y})^2 +$$
$$\omega_2 \sum_{D_2 \ni (x,y)} (\hat{g}_{x,y} - 2\hat{g}_{x,y+1} + \hat{g}_{x,y+2})^2 + \omega_3 \sum_{D_3 \ni (x,y)} (\hat{g}_{x,y} - g_{x,y})^2$$

In the expression above, $g_{x,y}$ represents a gradation value converted so as to correspond to the resolution of the shading correction circuit, which represents the gradation value at coordinates (x,y). Moreover, $\hat{g}_{x,y}$ represents an estimation value of the gradation value at the coordinates (x,y). In addition, $\omega_1$, $\omega_2$ and $\omega_3$ each represent a weight coefficient. $D_1$, $D_2$ and $D_3$ each represent a set of pixel area as calculation targets.

Although in this embodiment the estimation value is calculated through the interpolation by the evaluation expression above, any other interpolation methods may be used.

At step S707, the calculator 305 calculates, from information on the gradation distributions for R, G and B, which are converted so as to correspond to the resolutions of the shading correction circuits 201 to 203 at step S706, the shading correction values for R, G and B. A detailed description of the shading correction value calculation method will be omitted.

At step S708, the calculator 305 writes (stores) the shading correction values calculated at step S707 to the information memory circuit 212. Then, the calculator 305 ends this process at step S709.

This embodiment automatically detects (determines), of the captured image (correction value calculation captured image) used to calculate the shading correction values, the area where the color illuminometer 303 is captured and estimates the gradation values in that area through the interpolation process. This enables calculating the gamma correction table and the shading correction values continuously without removing the color illuminometer 303.

Embodiment 4

Embodiment 3 described the case of detecting the area (estimation target area) whose gradations are interpolated, by calculating the dispersion value of the gradation values. In contrast, in Embodiment 4 (fourth embodiment) of the present invention, gradations in an area specified by a user are interpolated in order to omit the dispersion calculation. Components of an image projection system in this embodiment are denoted by the same reference numerals as those in Embodiment 3.

Figure 24A:
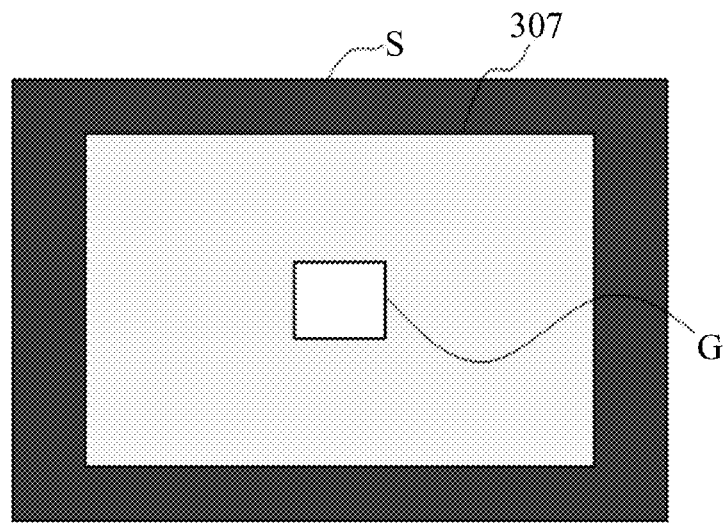
FIGS. 24A and 24B each illustrate a guide for displaying an estimation target area in which gradation is interpolated in Embodiment 4.

FIG. 24A illustrates an example of a guide which is displayed in a projection image to clearly indicate the estimation target area. On a screen S, reference numeral 307 denotes the projection image (raster image) projected by the projector 101, and reference numeral G denotes the guide displaying the estimation target area (including the hole 306 formed in the screen S and the color illuminometer 303 exposed inside the hole 306 in Embodiment 3) in which gradations are interpolated. The guide G indicates the estimation target area specified by the user before the calculations of the gamma correction characteristic and the shading correction value described in Embodiment 3 are started.

The calculator 305 outputs information on the estimation target area specified by the user, together with the raster gradation set command (described in Embodiment 1), to the projector 101. In the projector 101, the raster production circuit 211 produces the raster image to be projected, and the shading correction circuits 201 to 203 set the shading correction values different from each other to the estimation target area and an area other than the estimation target area. This causes the projector 101 to display the guide G indicating the estimation target area in the projected raster image.

Figure 24B:
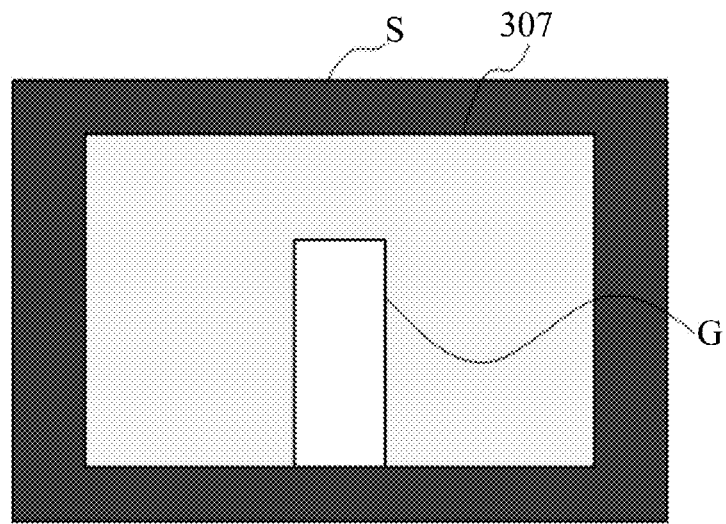
Figure 25A:
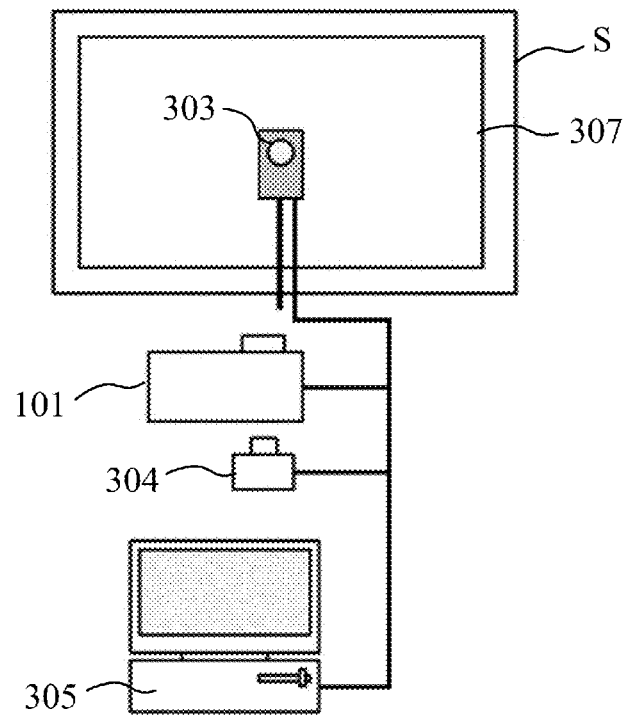
FIGS. 25A and 25B illustrate an arrangement of a gradation conversion characteristic and shading correction calculator, a projector, a camera, a screen and a color illuminometer in a modified example of Embodiment 3.
Figure 25B:
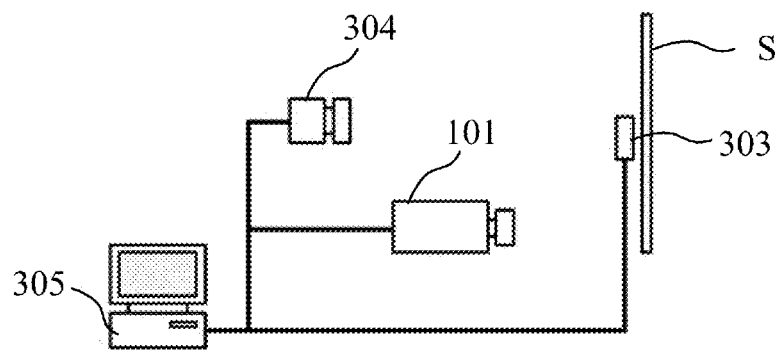

FIGS. 25A and 25B illustrate a case in which the color illuminometer 303 is placed in front of the screen S while being supported by a support member such as a tripod in the image projection system having the same configuration as that in Embodiment 3. In this case, as illustrated in FIG. 24B, the estimation target area is specified by the user to include the color illuminometer 303 and the support member, and the guide G corresponding thereto is displayed in the projection image (raster image) 307.

In this embodiment, the process of producing the gamma correction table and the process of calculating the shading correction value by calculating the first and second gradation values by using the first and second mapping relations are the same as those in Embodiment 3.

Figure 26A:
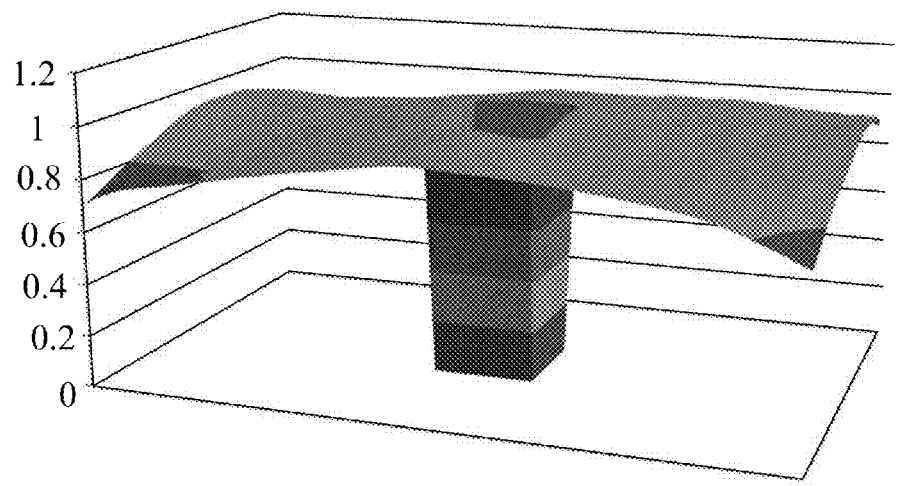
FIGS. 26A and 26B illustrate gradation distributions before and after the gradation interpolation of the estimation target area in Embodiment 4.
Figure 26B:
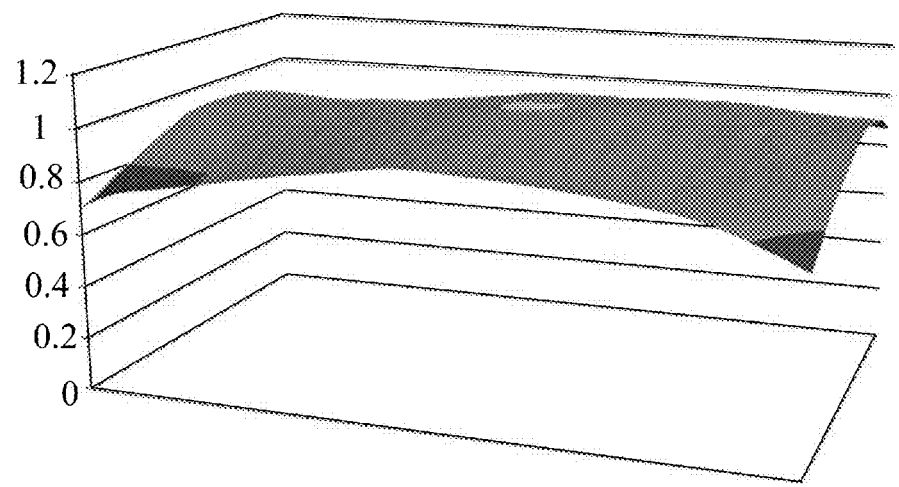

FIG. 26A illustrates a gradation distribution before the interpolation is performed on the gradations in the estimation target area indicated by the guide G in FIG. 24A. FIG. 26B illustrates a gradation distribution after the interpolation is performed on the gradations in the estimation target area.

Figure 27A:
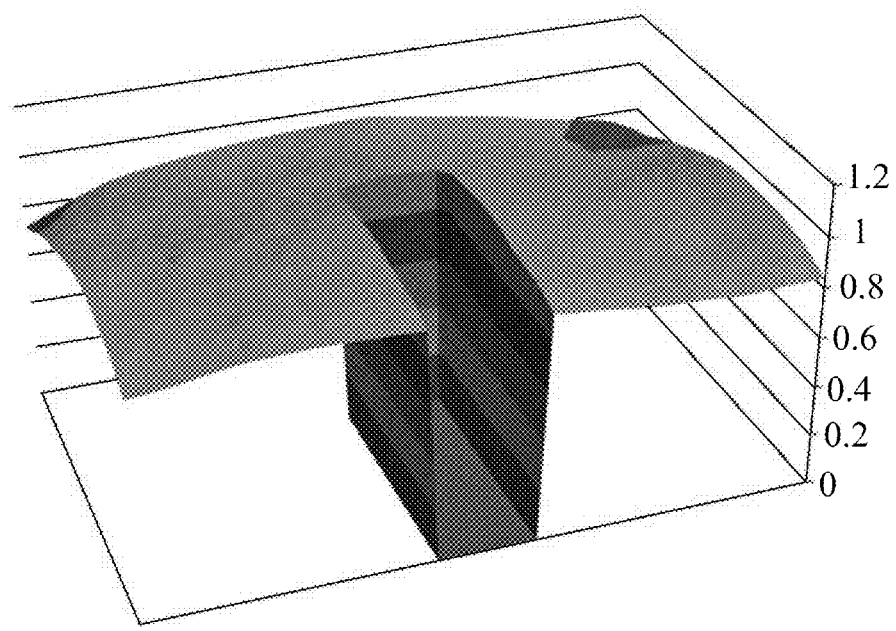
FIGS. 27A and 27B illustrate gradation distributions before and after the gradation interpolation of the estimation target area in a modified example of Embodiment 4.
Figure 27B:
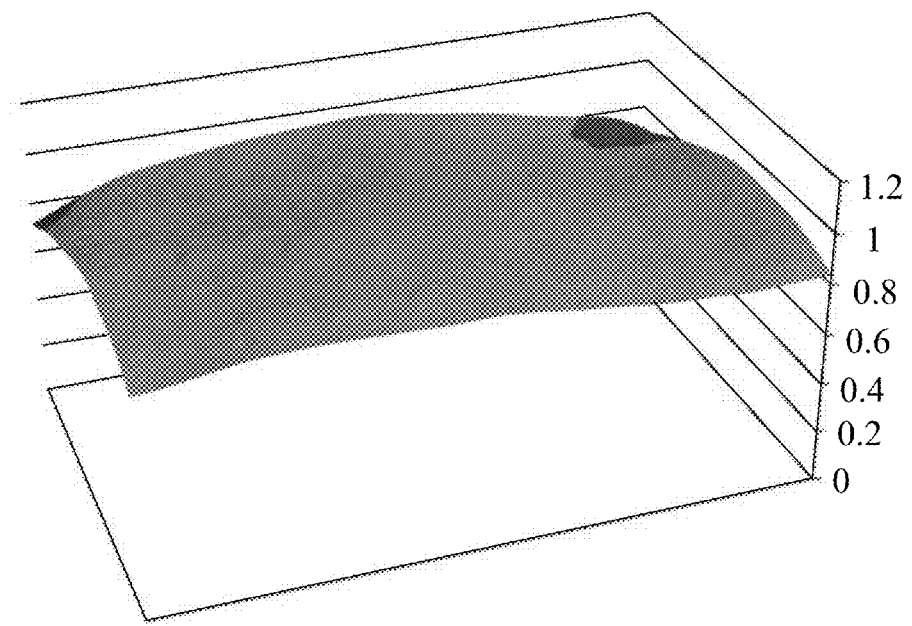

FIG. 27A illustrates a gradation distribution before the interpolation is performed on the gradations in the estimation target area indicated by the guide G illustrated in FIG. 24B. FIG. 27B illustrates a gradation distribution after the interpolation is performed on the gradations in the estimation target area.

As described above, in this embodiment, since the user specifies the area whose gradations are to be interpolated, in other words, the area where the color illuminometer 303 is captured, a possibility of falsely detecting the area can be eliminated.

Embodiment 5

Embodiments 3 and 4 each described the case of calculating, in the central area of the projection image, the shading correction value corresponding to no correction because the chromaticity is measured by the color illuminometer 303 disposed in the central area of the projection image to perform the adjustment of the gamma correction characteristic. Embodiment 5 (fifth embodiment) of the present invention will describe a case where the color illuminometer is disposed at a position other than the central area of the projection image. Components of an image projection system are denoted by the same reference numerals as those in Embodiment 3.

Figure 28:
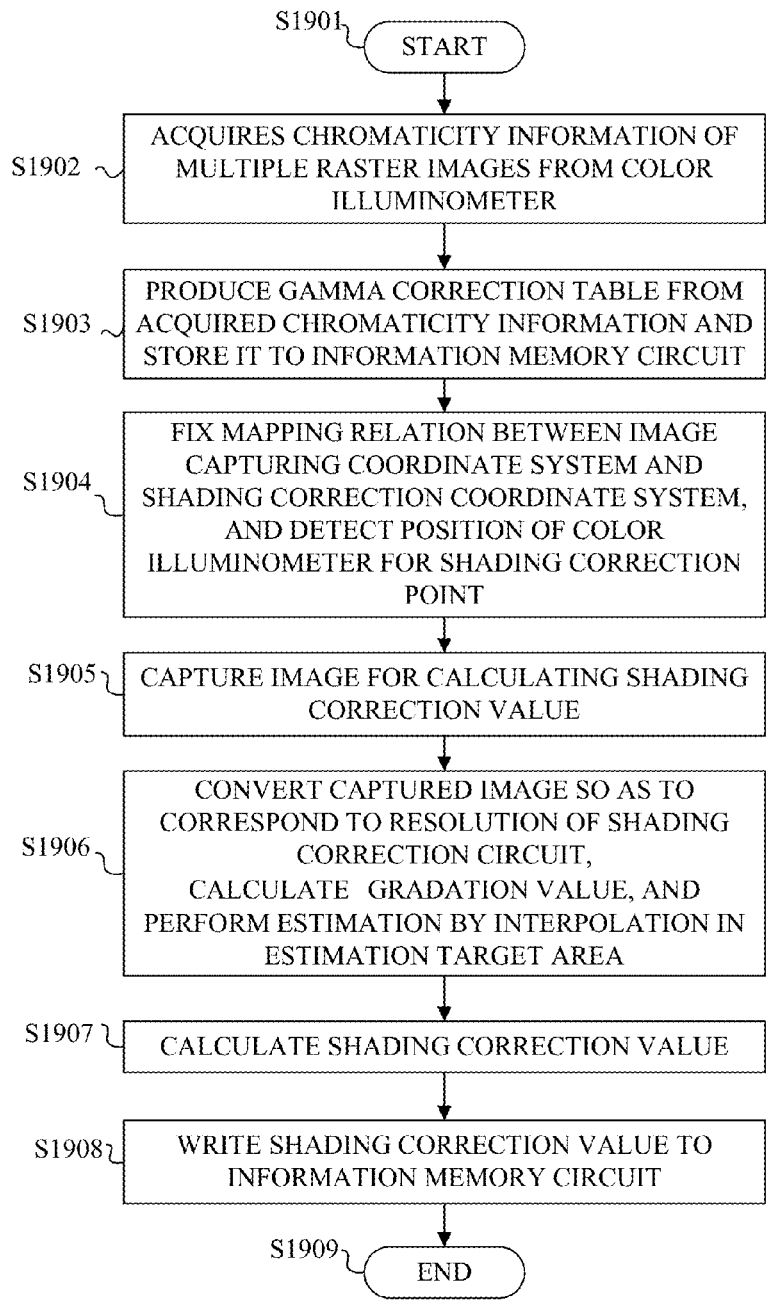
FIG. 28 is a flowchart of a process by a gradation conversion characteristic and shading correction calculation apparatus that is Embodiment 5.

A flowchart in FIG. 28 illustrates a flow of a process (gradation conversion characteristic/shading correction value calculation method) executed by the calculator 305 in this embodiment. The calculator 305 starting the process at step S1901 causes the projector 101, at step S1902, similarly to step S702 in Embodiment 3, to project multiple raster images and acquires chromaticity information thereof from the color illuminometer 303.

At step S1903, similarly to step S703 in Embodiment 3, the calculator 305 produces the gamma correction table listing the gamma correction characteristic from the chromaticity information acquired at step S1902, and writes the gamma correction table to the information memory circuit 212.

At step S1904, similarly to step S704 in Embodiment 3, the calculator 305 causes the projector 101 to project the projection images having the projection patterns illustrated in FIGS. 4A to 4E and 5A to 5E and causes the camera 304 to capture the projection images to acquire the captured images. Simultaneously, the calculator 305 acquires the chromaticity information from the color illuminometer 303 and monitors a gradation change due to the projection patterns. This determines a relation between the correction points of each shading correction circuit and a position at which the chromaticity is measured by the color illuminometer 303 (the position is hereinafter referred to as "a chromaticity measurement position of the color illuminometer 303"). The calculator 305 calculates the shading correction values using the chromaticity measurement position of the color illuminometer 303 as a reference, as described later.

This enables disposing the color illuminometer 303 not only in a central area of the screen S, but also at an arbitrary position.

At step S1905, similarly to step S705 in Embodiment 3, the calculator 305 causes the projector 101 to project at least one correction value calculation image whose gradations are set on the basis of the gamma correction table produced at step S1904. Then, the calculator 305 acquires the correction value calculation captured image from the camera 304 capturing the projected correction value calculation image.

At step S1906, similarly to step S706 in Embodiment 3, the calculator 305 converts the correction value calculation captured image such that its resolution corresponds to those of the shading correction circuits 201 to 203. The calculator 305 also estimates the gradation values in the estimation target area through the interpolation process.

At step S1907, similarly to step S707 in Embodiment 3, the calculator 305 calculates the shading correction values. In this embodiment, the calculator 305 sets, by using the chromaticity measurement position of the color illuminometer 303 as a reference, a shading correction value thereat to be zero. Then, the calculator 305 calculates the shading correction values such that their gradations are equal to constant multiplications of the reference shading profile described in Embodiment 3.

Specifically, the calculator 305 sets, for the gradation distribution of each light-modulating panel, the shading correction value at the chromaticity measurement position of the color illuminometer 303, which is a reference position, to be zero as a reference. Then, the calculator 305 sets a shading profile at a target gradation to be achieved, from this reference position and the condition that each shading profile needs to be the constant multiplication of the reference shading profile. The process so far uniquely sets, for one specific gradation, the shading correction value based on the reflectance of each light-modulating panel.

The calculator 305 performs the process at this step on gradations on respective shading correction planes at other specific gradations. This calculates all the shading correction values to be provided to each shading correction circuit.

At step S1908, similarly to step S708 in Embodiment 3, the calculator 305 writes (stores) the shading correction values calculated at step S1907 to the information memory circuit 212. Then, the calculator 305 ends this process at step S1909.

This embodiment enables, even when the color illuminometer 303 is disposed at an arbitrary position, efficiently calculating the gamma correction table and the shading correction values in a short time.

In Embodiments 3 to 5, the first gradation values in part of the shading correction coordinate system (that is, in the area other than the estimation target area) are calculated by performing the mapping transformation using the second mapping relation on the correction value calculation captured image, and the second gradation value in the estimation target area is calculated through the interpolation process using the first gradation values. However, the shading correction values (first correction values) in the part of the shading correction coordinate system (in the area other than the estimation target area) may be calculated from the first gradation values, and the shading correction value (second correction value) in the estimation target area may be calculated through the interpolation process using the first correction values.

Embodiments 3 to 5 each enable calculation of the shading correction values for sufficiently correcting the shading of the display image when the chromaticity measurer is captured in the captured image obtained by image capturing of the display image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-135709, filed on Jul. 1, 2014 and No. 2014-153541, filed on Jul. 29, 2014, which are hereby incorporated by reference wherein in their entirety.

What is claimed is:

1. A shading correction calculation apparatus configured to calculate a correction value by using a captured image acquired from an image capturing apparatus that captures a display image displayed on a display surface by an image display apparatus, the correction value being used for a shading correction to be performed by the image display apparatus, the shading correction calculation apparatus comprising:

a first mapping calculator configured to calculate a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus;

a second mapping calculator configured to calculate a second mapping relation by detecting an object part of the first mapping relation and removing the object part from the first mapping relation, the object part corresponding to an object located between the display surface and the image capturing apparatus;

a gradation value calculator configured to calculate a first gradation value in the shading correction coordinate system by performing a mapping transformation using the second mapping relation on a second captured image acquired from the image capturing apparatus that captures a second display image displayed by the image display apparatus;

a first correction value calculator configured to calculate, from the first gradation value, a first correction value as the correction value for a first part of the shading correction coordinate system; and a second correction value calculator configured to calculate, through an interpolation process using the first correction value, a second correction value as the correction value for a second part of the shading correction coordinate system, the second part being a part where the first gradation value is unable to be calculated by the mapping transformation.

2. A shading correction calculation apparatus configured to calculate a correction value by using a captured image acquired from an image capturing apparatus that captures a display image displayed on a display surface by an image display apparatus, the correction value being used for a shading correction to be performed by the image display apparatus, the shading correction calculation apparatus comprising:

a first mapping calculator configured to calculate a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus;

a second mapping calculator configured to calculate a second mapping relation by detecting an object part of the first mapping relation and removing the object part from the first mapping relation, the object part corresponding to an object located between the display surface and the image capturing apparatus;

a first gradation value calculator configured to calculate a first gradation value in a first part of the shading correction coordinate system by performing a mapping transformation using the second mapping relation on a second captured image acquired from the image capturing apparatus that captures a second display image displayed by the image display apparatus;

a second gradation value calculator configured to calculate, through an interpolation process using the first gradation value, a second gradation value in a second part of the shading correction coordinate system, the second part being a part where the first gradation value is unable to be calculated by the mapping transformation; and a correction value calculator configured to calculate the correction values for the first and second parts by using the first and second gradation values.

3. A shading correction calculation apparatus according to claim 1, wherein the second mapping calculator is configured to calculate the second mapping relation by removing, from the first mapping relation, the object part and its surrounding part.

4. A shading correction calculation apparatus according to claim 1, wherein the gradation value calculator and the first and second correction value calculators are configured to repeat a process from the acquisition of the second captured image to the calculation of the first and second correction values until each of the first and second correction values becomes equal to or smaller than a predetermined value.

5. A shading correction calculation apparatus according to claim 1, wherein the second mapping calculator is configured to detect as the object part a part where a degree of dispersion of gradation values obtained by a mapping transformation using the first mapping relation is larger than that in another part.

6. A shading correction calculation apparatus according to claim 1, wherein the second correction value calculator performs the interpolation process by (a) calculating a distance from the first part to a target part where the interpolation process is performed, (b) performing an interpolation using a constant interpolation value on the target part when the distance is longer than a predetermined distance and (c) performing an interpolation so as to minimize a distortion of gradation on the target part when the distance is shorter than the predetermined distance.

7. A shading correction calculation apparatus according to claim 1, further comprising:

a gradation conversion characteristic calculator configured to calculate a gradation conversion characteristic for obtaining a target chromaticity of the display image displayed by the image display apparatus, by using chromaticity information obtained by a chromaticity measurer that measures a chromaticity of the display image; and a third mapping calculator configured to calculate the second mapping relation (a) by detecting a measurer part of the first mapping relation and removing the measurer part from the first mapping relation, the measurer part corresponding to the chromaticity measurer captured in the second captured image, or (b) by removing a user-specified part specified by a user from the first mapping relation, wherein the gradation value calculator configured to calculate the first gradation value by performing the mapping transformation using the second mapping relation on the second captured image, the second captured image being acquired from the image capturing apparatus that captures a second display image displayed by the image display apparatus and displayed with its gradation set on a basis of the gradation conversion characteristic.

8. A shading correction calculation apparatus according to claim 7, wherein the third mapping calculator is configured to detect as the measurer part a part where a degree of dispersion of gradation values obtained by a mapping transformation using the first mapping relation is larger than a predetermined value or than that in another part.

9. A shading correction calculation apparatus according to claim 2, wherein the second gradation value calculator performs the interpolation process by (a) calculating a distance from the first part to a target part where the interpolation process is performed, (b) performing an interpolation using a constant interpolation value on the target part when the distance is longer than a predetermined distance and (c) performing an interpolation so as to minimize a distortion of gradation on the target part when the distance is shorter than the predetermined distance.

10. A shading correction calculation apparatus according to claim 2, further comprising:

a gradation conversion characteristic calculator configured to calculate a gradation conversion characteristic for obtaining a target chromaticity of the display image displayed by the image display apparatus, by using chromaticity information obtained by a chromaticity measurer that measures a chromaticity of the display image; and a third mapping calculator configured to calculate the second mapping relation (a) by detecting a measurer part of the first mapping relation and removing the measurer part from the first mapping relation, the measurer part corresponding to the chromaticity measurer captured in the second captured image, or (b) by removing a user-specified part specified by a user from the first mapping relation, wherein the gradation value calculator configured to calculate the first gradation value by performing the mapping transformation using the second mapping relation on the second captured image, the second captured image being acquired from the image capturing apparatus that captures a second display image displayed by the image display apparatus and displayed with its gradation set on a basis of the gradation conversion characteristic.

11. A shading correction calculation method of calculating a correction value by using a captured image acquired from an image capturing apparatus that captures a display image displayed on a display surface by an image display apparatus, the correction value being used for a shading correction to be performed by the image display apparatus, the method comprising:

calculating a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus;

calculating a second mapping relation by detecting an object part of the first mapping relation and removing the object part from the first mapping relation, the object part corresponding to an object located between the display surface and the image capturing apparatus;

calculating a first gradation value in the shading correction coordinate system by performing a mapping transformation using the second mapping relation on a second captured image acquired from the image capturing apparatus that captures a second display image displayed by the image display apparatus;

calculating, from the first gradation value, a first correction value as the correction value for a first part of the shading correction coordinate system; and calculating, through an interpolation process using the first correction value, a second correction value as the correction value for a second part of the shading correction coordinate system, the second part being a part where the first gradation value is unable to be calculated by the mapping transformation.

12. A shading correction calculation method of calculating a correction value by using a captured image acquired from an image capturing apparatus that captures a display image displayed on a display surface by an image display apparatus, the correction value being used for a shading correction to be performed by the image display apparatus, the method comprising:

calculating a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus;

calculating a second mapping relation by detecting an object part of the first mapping relation and removing the object part from the first mapping relation, the object part corresponding to an object located between the display surface and the image capturing apparatus;

calculating a first gradation value in a first part of the shading correction coordinate system by performing a mapping transformation using the second mapping relation on a second captured image acquired from the image capturing apparatus that captures a second display image displayed by the image display apparatus;

calculating, through an interpolation process using the first gradation value, a second gradation value in a second part of the shading correction coordinate system, the second part being a part where the first gradation value is unable to be calculated by the mapping transformation; and calculating the correction values for the first and second parts by using the first and second gradation values.

13. A shading correction calculation method according to claim 11, further comprising:

calculating a gradation conversion characteristic for obtaining a target chromaticity of the display image displayed by the image display apparatus, by using chromaticity information obtained by a chromaticity measurer that measures a chromaticity of the display image; and calculating the second mapping relation (a) by detecting a measurer part of the first mapping relation and removing the measurer part from the first mapping relation, the measurer part corresponding to the chromaticity measurer captured in the second captured image, or (b) by removing a user-specified part specified by a user from the first mapping relation, wherein the method calculates the first gradation value by performing the mapping transformation using the second mapping relation on the second captured image, the second captured image being acquired from the image capturing apparatus that captures a second display image displayed by the image display apparatus and displayed with its gradation set on a basis of the gradation conversion characteristic.

14. A shading correction calculation method according to claim 12, further comprising:

calculating a gradation conversion characteristic for obtaining a target chromaticity of the display image displayed by the image display apparatus, by using chromaticity information obtained by a chromaticity measurer that measures a chromaticity of the display image; and calculating the second mapping relation (a) by detecting a measurer part of the first mapping relation and removing the measurer part from the first mapping relation, the measurer part corresponding to the chromaticity measurer captured in the second captured image, or (b) by removing a user-specified part specified by a user from the first mapping relation, wherein the method calculates the first gradation value by performing the mapping transformation using the second mapping relation on the second captured image, the second captured image being acquired from the image capturing apparatus that captures a second display image displayed by the image display apparatus and displayed with its gradation set on a basis of the gradation conversion characteristic.

15. A non-transitory computer-readable storage medium storing a shading correction value calculation program as a computer program configured to cause a computer to perform a calculation process for calculating a correction value by using a captured image acquired from an image capturing apparatus that captures a display image displayed on a display surface by an image display apparatus, the correction value being used for a shading correction to be performed by the image display apparatus, the calculation process comprising:

calculating a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus;

calculating a second mapping relation by detecting an object part of the first mapping relation and removing the object part from the first mapping relation, the object part corresponding to an object located between the display surface and the image capturing apparatus;

calculating a first gradation value in the shading correction coordinate system by performing a mapping transformation using the second mapping relation on a second captured image acquired from the image capturing apparatus that captures a second display image displayed by the image display apparatus;

calculating, from the first gradation value, a first correction value as the correction value for a first part of the shading correction coordinate system; and calculating, through an interpolation process using the first correction value, a second correction value as the correction value for a second part of the shading correction coordinate system, the second part being a part where the first gradation value is unable to be calculated by the mapping transformation.

16. A non-transitory computer-readable storage medium storing a shading correction value calculation program as a computer program configured to cause a computer to perform a calculation process for calculating a correction value by using a captured image acquired from an image capturing apparatus that captures a display image displayed on a display surface by an image display apparatus, the correction value being used for a shading correction to be performed by the image display apparatus, the calculation process comprising:

calculating a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus;

calculating a second mapping relation by detecting an object part of the first mapping relation and removing the object part from the first mapping relation, the object part corresponding to an object located between the display surface and the image capturing apparatus;

calculating a first gradation value in a first part of the shading correction coordinate system by performing a mapping transformation using the second mapping relation on a second captured image acquired from the image capturing apparatus that captures a second display image displayed by the image display apparatus;

calculating, through an interpolation process using the first gradation value, a second gradation value in a second part of the shading correction coordinate system, the second part being a part where the first gradation value is unable to be calculated by the mapping transformation; and calculating the correction values for the first and second parts by using the first and second gradation values.

17. A non-transitory computer-readable storage medium according to claim 15, the calculation process further comprising:

calculating a gradation conversion characteristic for obtaining a target chromaticity of the display image displayed by the image display apparatus, by using chromaticity information obtained by a chromaticity measurer that measures a chromaticity of the display image; and calculating the second mapping relation (a) by detecting a measurer part of the first mapping relation and removing the measurer part from the first mapping relation, the measurer part corresponding to the chromaticity measurer captured in the second captured image, or (b) by removing a user-specified part specified by a user from the first mapping relation, wherein the calculation process calculates the first gradation value by performing the mapping transformation using the second mapping relation on the second captured image, the second captured image being acquired from the image capturing apparatus that captures a second display image displayed by the image display apparatus and displayed with its gradation set on a basis of the gradation conversion characteristic.

18. A non-transitory computer-readable storage medium according to claim 16, the calculation process further comprising:

calculating a gradation conversion characteristic for obtaining a target chromaticity of a display image displayed by the image display apparatus, by using chromaticity information obtained by a chromaticity measurer that measures a chromaticity of the display image; and calculating the second mapping relation (a) by detecting a measurer part of the first mapping relation and removing the measurer part from the first mapping relation, the measurer part corresponding to the chromaticity measurer captured in the second captured image, or (b) by removing a user-specified part specified by a user from the first mapping relation, wherein the calculation process calculates the first gradation value by performing the mapping transformation using the second mapping relation on the second captured image, the second captured image being acquired from the image capturing apparatus that captures a second display image displayed by the image display apparatus and displayed with its gradation set on a basis of the gradation conversion characteristic.

19. An image display apparatus configured to display a display image by projecting the display image on a display surface, the image display apparatus comprising:

an image capturing apparatus configured to capture the display image to produce a captured image; and a shading correction calculation apparatus configured to calculate a correction value by using the captured image acquired from the image capturing apparatus, the correction value being used for a shading correction to be performed by the image display apparatus, the shading correction calculation apparatus comprising:

a first mapping calculator configured to calculate a first mapping relation by using a first captured image acquired from the image capturing apparatus that captures a first display image displayed by the image display apparatus, the first mapping relation representing a relation of mapping from an image capturing coordinate system of the image capturing apparatus to a shading correction coordinate system of the image display apparatus;

a second mapping calculator configured to calculate a second mapping relation by detecting an object part of the first mapping relation and removing the object part from the first mapping relation, the object part corresponding to an object located between the display surface and the image capturing apparatus;

a gradation value calculator configured to calculate a first gradation value in the shading correction coordinate system by performing a mapping transformation using the second mapping relation on a second captured image acquired from the image capturing apparatus that captures a second display image displayed by the image display apparatus;

a first correction value calculator configured to calculate, from the first gradation value, a first correction value as the correction value for a first part of the shading correction coordinate system; and a second correction value calculator configured to calculate, through an interpolation process using the first correction value, a second correction value as the correction value for a second part of the shading correction coordinate system, the second part being a part where the first gradation value is unable to be calculated by the mapping transformation.

20. An image display apparatus according to claim 19, the shading correction calculation apparatus further comprising:

a gradation conversion characteristic calculator configured to calculate a gradation conversion characteristic for obtaining a target chromaticity of the display image displayed by the image display apparatus, by using chromaticity information obtained by a chromaticity measurer that measures a chromaticity of the display image; and a third mapping calculator configured to calculate the second mapping relation (a) by detecting a measurer part of the first mapping relation and removing the measurer part from the first mapping relation, the measurer part corresponding to the chromaticity measurer captured in the second captured image, or (b) by removing a user-specified part specified by a user from the first mapping relation, wherein the gradation value calculator configured to calculate the first gradation value by performing the mapping transformation using the second mapping relation on the second captured image, the second captured image being acquired from the image capturing apparatus that captures a second display image displayed by the image display apparatus and displayed with its gradation set on a basis of the gradation conversion characteristic.

* * * * *